(12) United States Patent  (10) Patent No.: US 8,594,101 B2
Nakagawa  (45) Date of Patent: Nov. 26, 2013

(54) PACKET RELAY APPARATUS AND PACKET RELAY METHOD

(75) Inventor: Yukihiro Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 572 days.

(21) Appl. No.: 12/770,839

(22) Filed: Apr. 30, 2010

(65) Prior Publication Data

US 2010/0284410 A1 Nov. 11, 2010

(30) Foreign Application Priority Data

May 8, 2009 (JP) ................................. 2009-114009

(51) Int. Cl.
*H04L 12/28* (2006.01)

(52) U.S. Cl.
USPC .......................................................... 370/401

(58) Field of Classification Search
None
See application file for complete search history.

(56) References Cited

U.S. PATENT DOCUMENTS

| | | | | |
|---|---|---|---|---|
| 5,963,556 | A * | 10/1999 | Varghese et al. | 370/401 |
| 6,993,033 | B1 * | 1/2006 | Williams | 370/400 |
| 7,933,268 | B1 * | 4/2011 | Melman et al. | 370/389 |
| 2004/0156359 | A1 | 8/2004 | Nakagawa | |
| 2004/0156376 | A1 | 8/2004 | Nakagawa | |
| 2007/0127376 | A1 | 6/2007 | Chao et al. | |
| 2007/0195793 | A1 | 8/2007 | Grosser et al. | |
| 2007/0268903 | A1 | 11/2007 | Nakagawa | |

FOREIGN PATENT DOCUMENTS

| | | |
|---|---|---|
| EP | 2 192 725 | 6/2010 |
| JP | 2004-242335 | 8/2004 |
| JP | 2004-242337 | 8/2004 |

OTHER PUBLICATIONS

European Communication pursuant to Article 94(3) dated Aug. 20, 2012, from corresponding European Application No. 10 162 332.0.
European Search Report dated Jul. 28, 2010, from corresponding European Application No. 10 16 2332.

* cited by examiner

*Primary Examiner* — Dang Ton
*Assistant Examiner* — Ronald H Davis
(74) *Attorney, Agent, or Firm* — Katten Muchin Rosenman LLP

(57) ABSTRACT

A packet relay apparatus identifies port information for identifying a port, included in a partition corresponding to a reception port having received a packet, from a partition information storing unit which stores a correspondence between port information for identifying ports included in the partition and partition information for identifying the partition configured for the apparatus. The apparatus determines whether the identified port information is included in the port information stored by being corresponded to reception VLAN information which is VLAN information set for a received packet by a VLAN information storing unit which is a storing unit storing a correspondence between port information for identifying a port used for transmission and/or reception of a packet transmitted and VLAN information for identifying the virtual network. The apparatus transmits the packet from a port determined to include the port information in response to the determination that the port information is included.

19 Claims, 29 Drawing Sheets

FIG. 6

| MAC ADDRESS | VLAN INFORMATION | PORT INFORMATION |
|---|---|---|
| 00:01:02:03:04:05 | 1 | 5 |
| 00:01:02:03:04:06 | 1 | 3 |
| 00:01:02:03:04:07 | 1 | 10 |
| ... | ... | ... |

FIG. 7

| PARTITION INFORMATION | PORT INFORMATION |
|---|---|
| 1 | 1, 2, 5 |
| 2 | 3, 6, 7 |
| 3 | NULL |
| ... | ... |
| 64 | NULL |

FIG. 8

| VLAN INFORMATION | PORT INFORMATION |
|---|---|
| 1 | 1, 2, 5, 3, 6, 7 |
| 2 | 1, 2, 5, 3, 6, 7 |
| ... | ... |
| 4095 | 1, 2, 5, 3, 6, 7 |

FIG. 12

| VLAN INFORMATION | PORT INFORMATION |
|---|---|
| 1 | 1, 2, 3, 6, 7 |
| 2 | 1, 2, 5, 3, 6, 7 |
| ... | ... |
| 4095 | 1, 2, 5, 3, 6, 7 |

FIG. 15

| NAME | VLAN TABLE LEARN RANGE |
|---|---|
| CODE | 150 (REQUEST) / 151 (REPLY) |
| PURPOSE | LEARN ENTRIES IN THE VLAN TABLE. |
| FIELD DESCRIPTION | |
| EXTENDED VLAN ID | EXTENDED VLD ID |
| EXTENDED VLAN INCLUSIVE | PORT VECTOR TO BE ADDED FOR THE EXTENDED VLAN |
| EXTENDED VLAN EXCLUSIVE | PORT VECTOR TO BE REMOVED FROM THE EXTENDED VLAN |
| V | VALID BIT |
| VLAN ID | VLAN ID |
| USE | USE BIT PER PORT |
| BIT ENABLE USE | USE DATA BIT ENABLE |
| VLAN TBL. INFO. | VLAN TABLE INFORMATION (FILLED IN REPLY) [0] 1=SUCCESS, 0=FAIL |

| 0 | | 7 | 8 | | 15 | 16 | | 23 | 24 | | 31 |
|---|---|---|---|---|---|---|---|---|---|---|---|
| 0 | | | 0 | | | CODE (150 OR 151) | | | | | |
| | | | | | | EXTENDED VLAN ID | | | | | |
| 0 | | | | | | EXTENDED VLAN INCLUSIVE | | | | | |
| 0 | | | | | | EXTENDED VLAN EXCLUSIVE | | | | | |
| 0 | | | | | | VLAN ID END | V | 0 | | VLAN ID START | |
| 0 | | | | | | | USE | | | | |
| 0 | | | | | | | BIT ENABLE (USE) | | | | |
| | | | | | | VLAN TABLE INFORMATION | | | | | |

FIG. 19

| PARTITION INFORMATION | PORT INFORMATION |
|---|---|
| 1 | 0/0、0/1、0/2、0/3 |
| 2 | 1/0、1/1、1/2、2/0 |
| ... | ... |

FIG. 23

| N | M | L | THE NUMBER OF LOCAL PARTITIONS | THE NUMBER OF GLOBAL PARTITIONS | THE NUMBER OF TOTAL PARTITIONS |
|---|---|---|---|---|---|
| 0 | 0 | 64 | 0 | 64 | 64 |
| 16 | 0 | 48 | 128 | 48 | 176 |
| 16 | 16 | 32 | 128~256 | 32~48 | 176~288 |
| 16 | 32 | 16 | 128~384 | 16~48 | 176~400 |
| 16 | 48 | 0 | 128~512 | 0~48 | 176~512 |
| 32 | 0 | 32 | 256 | 32 | 288 |
| 32 | 16 | 16 | 256~384 | 16~32 | 288~400 |
| 32 | 32 | 0 | 256~512 | 0~32 | 288~512 |
| 64 | 0 | 0 | 512 | 0 | 512 |

FIG. 25

| RECEPTION PORT | PARTITION INFORMATION | PORT INFORMATION |
|---|---|---|
| 1 | 1 | 1, 2, 5 |
| 2 | 2 | 1, 2, 5 |
| 3 | 3 | 3, 6, 7 |
| 4 | 4 | |
| 5 | 5 | 1, 2, 5 |
| 6 | 6 | 3, 6, 7 |
| 7 | 7 | 3, 6, 7 |

FIG. 26

| RECEPTION PORT | PARTITION INFORMATION | PORT INFORMATION |
|---|---|---|
| 1 | 1 | 1, 5 |
| 2 | 2 | 1, 2, 5 |
| 3 | 3 | 3, 6, 7 |
| 4 | 4 | |
| 5 | 5 | 1, 2, 5 |
| 6 | 6 | 3, 6, 7 |
| 7 | 7 | 3, 6, 7 |

FIG. 27

| PARTITION INFORMATION | PORT INFORMATION |
|---|---|
| 1 | |
| 2 | 1/0, 1/1, 1/2, 1/C |
| ... | ... |

FIG. 28

| PARTITION INFORMATION | PORT INFORMATION |
|---|---|
| 1 | |
| 2 | 2/0、2/D |
| ... | ... |

ND PACKET
PACKET RELAY APPARATUS AND PACKET RELAY METHOD

CROSS-REFERENCE TO RELATED APPLICATIONS

This application is based upon and claims the benefit of priority of the prior Japanese Patent Application No. 2009-114009, filed on May 8, 2009, the entire contents of which are incorporated herein by reference.

FIELD

The embodiments discussed herein are related to a packet relay technology.

BACKGROUND

There may be a case where a user configures partitions of a packet relay apparatus that is provided with a plurality of ports for packet transmission/reception. The packet relay apparatus, for which the partitions are configured, transmits a packet from one port within one of the partitions that includes another port having received the packet. In other words, the packet relay apparatus does not transmit the received packet from a port included in the other partition(s).

For example, now, assume that the plurality of ports is used by two departments, for example, a Department A and a Department B. One partition is configured with respect to the ports that are used by the Department A, and on the other hand, the other partition is configured with respect to the ports that are used by the Department B, in the packet relay apparatus. Upon receipt of a packet, the packet relay apparatus transmits the packet, received by the port used by the Department A, from a port included within the partition for the Department A. In other words, the packet relay apparatus does not transmit the packet from a port included within the partition for the Department B.

A method of forming a Virtual Local Area Network (VLAN) on a physical network has been conventionally known, and packet relay apparatuses that achieve a transparent VLAN network have been studied, as well. Note that the term "transparent VLAN network" means a network capable of relaying packets regardless of values of VLAN information which are set for the packets. In other words, the packet relay apparatus achieving the transparent VLAN network is capable of relaying the packets regardless of the values of the VLAN information. Note that the term "VLAN information" means information for identifying a VLAN to which an apparatus designated as a packet transmission source belongs.

For example, a Q-in-Q technique has been known as one of the techniques achieving the transparent VLAN network. Upon receipt of a packet, a packet relay apparatus, which performs the Q-in-Q technique, attaches a piece of VLAN information that is used within the same apparatus to the packet. In addition, the packet relay apparatus attaches the same VLAN information to all the packets. Then, the received packet is handled, within the same apparatus, as the one for which the same VLAN information is set, by the packet relay apparatus, regardless of the VLAN information set for the received packet, and the packet is transmitted from a port within the partition that includes the port having received the packet. Techniques related to packet queuing have been discussed.

However, the above technique achieving the transparent network has a disadvantage that it is difficult to separately handle the packets with respect to each VLAN. More specifically, the packet relay apparatus, which performs the Q-in-Q technique, handles all of the packets as the ones for which the same VLAN information is set, within the apparatus. In other words, this packet relay apparatus handles the packets as the ones derived from the same VLAN.

The technique hereinafter disclosed is in view of the disadvantage discussed above, and the purpose of the present disclosure is to provide a packet relay apparatus capable of separately handling packets with respect to each VLAN.

SUMMARY

A packet relay apparatus includes a plurality of ports. A partition information storing unit stores a correspondence between port information for identifying a plurality of ports included in a partition and partition information for identifying the partition configured for the packet relay apparatus. A VLAN information storing unit is a storing unit storing a correspondence between the port information for identifying a port used for transmission and/or reception of a packet transmitted by an apparatus belonging to a virtual network and VLAN information for identifying the virtual network, the VLAN information storing unit storing all the port information stored by the partition information storing unit, as the port information, in advance. An identification unit identifies the port information for identifying the port, included in the partition corresponding to the reception port, from the partition information storing unit, upon receipt of the packet. A determination unit identifies reception VLAN information which is the VLAN information set for the received packet and determines whether the port information identified by the identification unit is included in the port information corresponded to the identified reception VLAN information and stored in the VLAN information storing unit. A transmission unit transmits the packet from the port determined to include the port information in response to the determination by the determination unit that the port information is included.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

BRIEF DESCRIPTION OF THE DRAWINGS

FIG. 6 illustrates a table for explaining one example of a MAC address storing unit according to the second embodiment;

FIG. 7 illustrates a table for explaining one example of a partition information storing unit according to the second embodiment;

FIG. 8 illustrates a table for explaining one example of a VLAN information storing unit according to the second embodiment;

FIG. 12 illustrates a table for explaining one example of a VLAN information storing unit according to a third embodiment;

FIG. 15 illustrates tables for explaining one example of formats of configuration contents transmitted by a configuration contents acceptance unit according to the fourth embodiment;

FIG. 19 illustrates a table for explaining one example of a partition information storing unit according to the fifth embodiment;

FIG. 23 illustrates a table for explaining a relationship between the number of pieces of allocated partition information and the number of configurable partitions according to the sixth embodiment;

FIG. 25 illustrates a table for explaining one example of a partition information storing unit in configuring the partitions with respect to each reception port;

FIG. 26 illustrates another table for explaining another example of the partition information storing unit in configuring the partitions with respect to each reception port;

FIG. 27 illustrates a table for explaining one example of a partition information storing unit according to a packet relay apparatus [1];

FIG. 28 illustrates a table for explaining one example of a partition information storing unit according to a packet relay apparatus [2]

DESCRIPTION OF EMBODIMENTS

Hereinafter, preferred embodiments of a packet relay apparatus according to the present application will be disclosed in detail with reference to drawings. Note that the present invention is not limited by these preferred embodiments disclosed hereinbelow.

Figure 1:
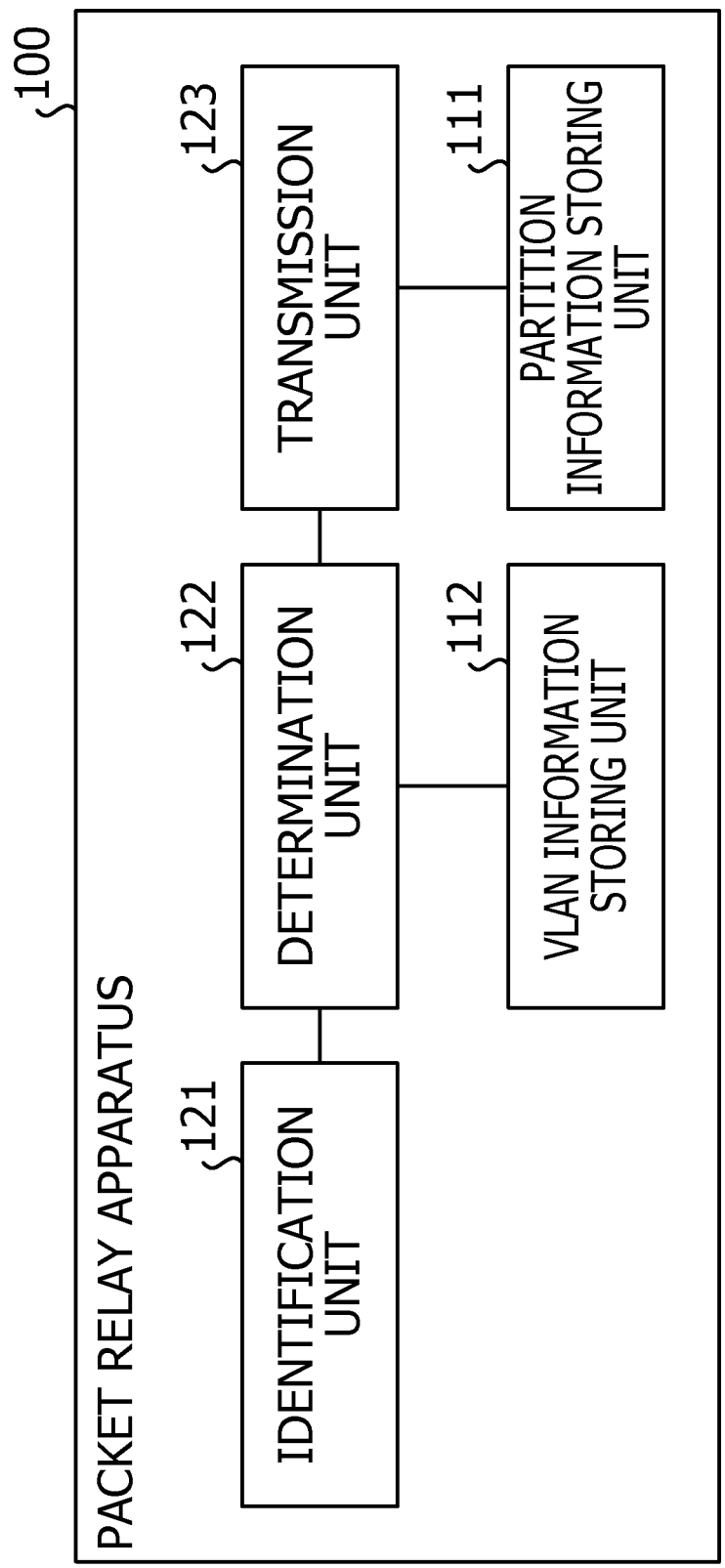
FIG. 1 illustrates a block diagram for explaining one example of a configuration of a packet relay apparatus according to a first embodiment.

First of all, one example of a configuration of a packet relay apparatus 100 according to a first embodiment will be disclosed with reference to FIG. 1. FIG. 1 illustrates a block diagram for explaining one example of the configuration of the packet relay apparatus 100 according to the first embodiment.

The packet relay apparatus 100 according to the first embodiment includes a plurality of ports (not shown). As illustrated in FIG. 1, the packet relay apparatus 100 includes a partition information storing unit 111, a VLAN information storing unit 112, an identification unit 121, a determination unit 122, and a transmission unit 123.

The partition information storing unit 111 stores a correspondence between partition information and port information. The term "partition information" means information for identifying partitions configured for the packet relay apparatus 100. The term "port information" means information for identifying a plurality of ports included within a partition.

The VLAN information storing unit 112 stores a correspondence between VLAN information and the port information by which a port used for transmission/reception of a packet is identified. The term "VLAN information" means information for identifying virtual networks. In addition, the VLAN information storing unit 112 stores all pieces of the port information stored by the partition information storing unit 111, as the port information, in advance.

Upon receipt of the packet, the identification unit 121 identifies a piece of port information for identifying the port included within the partition corresponding to the port having received the packet (hereinafter, referred to as a "reception port"), from the partition information storing unit 111.

The determination unit 122 identifies reception VLAN information which is the VLAN information set for the received packet. Then, the determination unit 122 determines whether the port information identified by the identification unit 121 is included in the port information corresponded to the identified reception VLAN information and stored in the VLAN information storing unit 112 or not. Note that, as disclosed above, since the VLAN information storing unit 112 stores all pieces of the port information stored by the partition information storing unit 111, the determination unit 122 determines that the identified port information is included therein, in the first embodiment.

In response to the determination, made by the determination unit 122, that the identified port information is included, the transmission unit 123 transmits the packet from a port so determined. Note that the port which transmits the packet is, as disclosed above, the port included in the partition corresponding to the reception port.

[Processing Carried Out by the Packet Relay Apparatus According to the First Embodiment]

Figure 2:
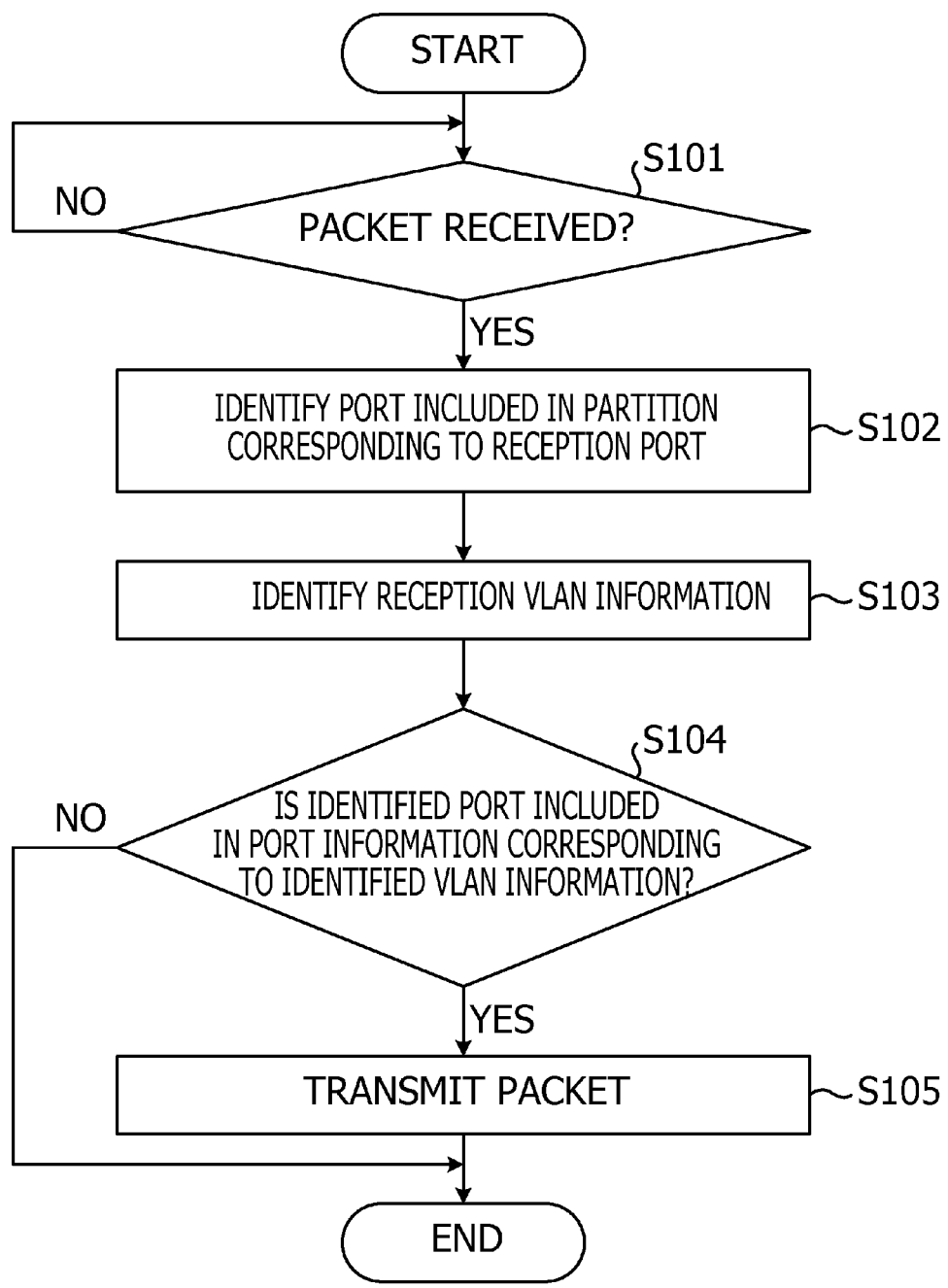
FIG. 2 illustrates a flowchart for explaining one example of processing flow by the packet relay apparatus according to the first embodiment.

Next, one example of processing flow carried out by the packet relay apparatus 100 according to the first embodiment will be disclosed with reference to FIG. 2. FIG. 2 illustrates a flowchart for explaining one example of the processing flow carried out by the packet relay apparatus 100 according to the first embodiment.

As illustrated in FIG. 2, upon receipt of a packet (Operation S101 Yes), the identification unit 121 identifies the port included in the partition corresponding to the reception port (Operation S102), in the packet relay apparatus 100 according to the first embodiment.

The determination unit 122 identifies the reception VLAN information (Operation S103) and determines whether the identified port information is included in the port information corresponded to the identified reception VLAN information or not (Operation S104).

Here, in response to the determination, made by the determination unit 122, that the identified port information is included therein (Operation S104 Yes), the transmission unit 123 transmits the packet from the port so determined (Operation S105).

On the other hand, in response to the determination, made by the determination unit 122, that the identified port information is not included therein (Operation S104 No), no packet is transmitted by the transmission unit 123 and the processing by the packet relay apparatus 100 terminates.

As disclosed above, according to the first embodiment, the packet relay apparatus 100 includes the partition information storing unit 111 and the VLAN information storing unit 112. The VLAN information storing unit 112 stores all pieces of the port information stored by the partition information storing unit 111, as the port information, in advance. Next, upon receipt of the packet, the identification unit 121 identifies the port information for identifying the port included in the partition corresponding to the reception port, from the partition information storing unit 111. The determination unit 122 identifies the reception VLAN information that is the VLAN information set for the received packet and determines whether the port information identified by the identification unit 121 is included in the port information corresponded to the identified reception VLAN information and stored in the VLAN information storing unit 112 or not. In response to the determination, made by the determination unit 122, that the identified port information is included therein, the transmission unit 123 transmits the packet from the port so determined. As a result thereof, it is possible to handle the packets separately with respect to each VLAN according to the first embodiment.

More specifically, the transparent network may be achieved by a configuration that ports in one partition can be used by all the VLANs even for cases where the packets are separately relayed with respect to each VLAN. For example, as disclosed above, the transparent network may be achieved even for cases where the determination of whether or not a certain reception port is the one capable of transmitting/receiving a packet of a certain VLAN is made, and thereafter the packet is transmitted.

Next, a packet relay apparatus 200 according to a second embodiment will be disclosed. Note that the packet relay apparatus 200 corresponds to the packet relay apparatus 100 according to the first embodiment.

Hereinafter, first of all, an outline of the packet relay apparatus 200 according to the second embodiment and one example of a configuration of the packet relay apparatus 200 will be disclosed. Next, processing carried out by the packet relay apparatus 200 will be disclosed in turn. Thereafter, an advantageous effect achieved by the second embodiment will be disclosed. Note that the descriptions of structural elements or the like that are the same as or similar to those disclosed in the packet relay apparatus 100 according to the first embodiment will be simplified or omitted.

The outline of the packet relay apparatus (also referred to as a "switch") 200 according to the second embodiment will be disclosed. The packet relay apparatus 200 according to the second embodiment includes a plurality of ports for transmitting/receiving a packet(s), and the packet(s) is relayed.

A user is capable of configuring a partition(s) of the packet relay apparatus 200 according to the second embodiment. Once a partition is configured, the packet relay apparatus 200 transmits a packet from a port different from a reception port in the partition that includes the reception port. That is to say, the packet is not transmitted from the ports included in another partition/the other partitions.

For example, the description is made, as an example, for a case where a plurality of ports of the packet relay apparatus 200 is used by two departments, namely, a Department A and a Department B, will be disclosed. One partition is configured with respect to the ports used by the Department A and the other partition is configured with respect to the ports used by the Department B, in the packet relay apparatus 200. In the above packet relay apparatus 200, a packet, which is received by the port used by the Department A, is transmitted from another port within the partition used by the Department A. That is to say, the packet is not transmitted from a port within the partition used by the Department B.

Here, the packet relay apparatus 200 according to the second embodiment is a switch capable of achieving a transparent network by a configuration that the ports in a certain partition are used by all VLANs even for cases where packets are separately relayed with respect to each VLAN, as will be disclosed below.

More specifically, the packet relay apparatus 200 according to the second embodiment is the switch achieving a transparent VLAN network and transmits a received packet regardless of VLAN information set for the received packet.

Figure 3:
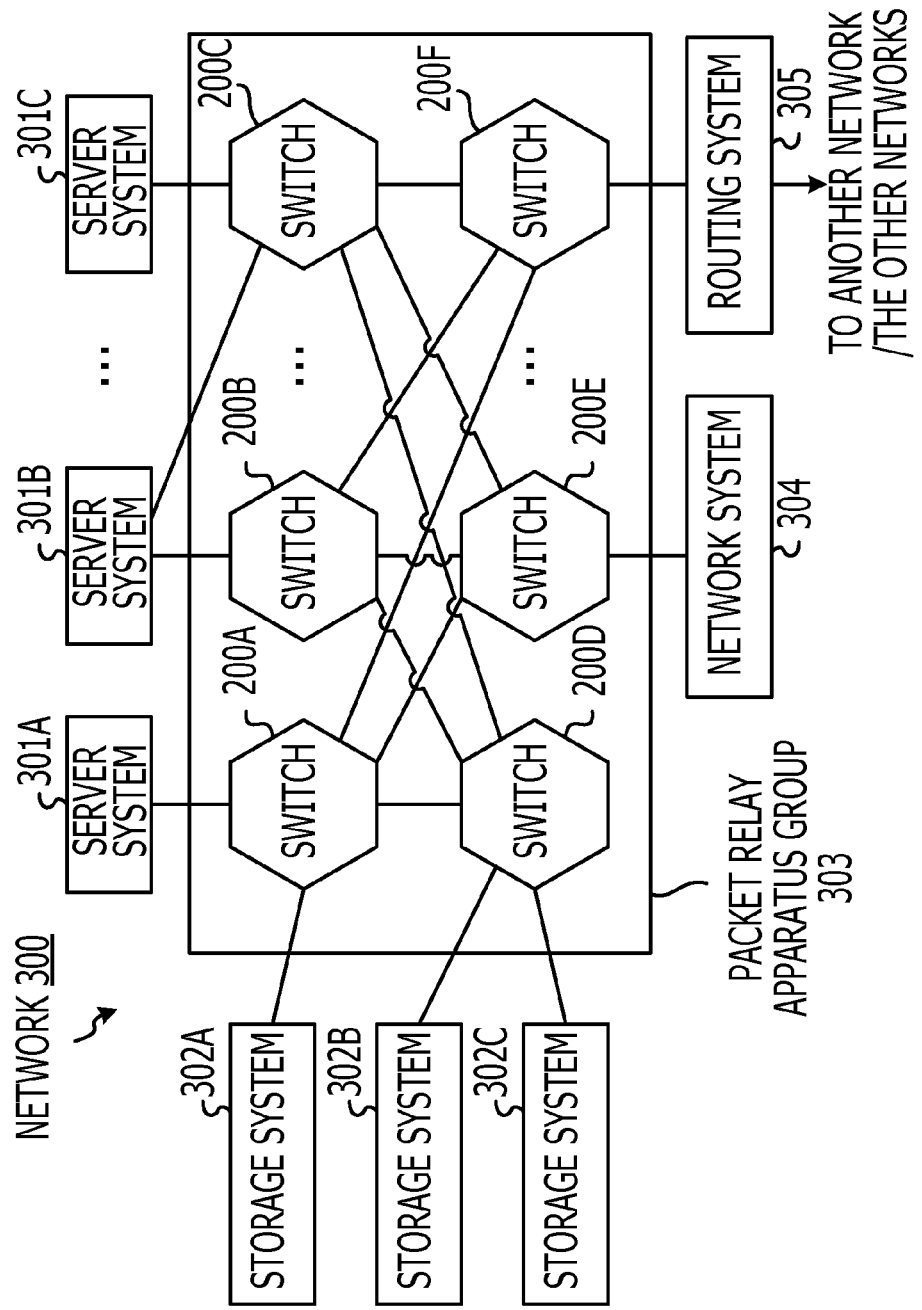
FIG. 3 illustrates a diagram for explaining one example of a network configuration in which packet relay apparatuses according to a second embodiment is used.

Next, one example of a configuration of a network 300 in which the packet relay apparatus(es) 200 according to the second embodiment is used will be disclosed with reference to FIG. 3. FIG. 3 is a diagram for explaining one example of the configuration of the network in which the packet relay apparatus(es) according to the second embodiment is used.

As illustrated in FIG. 3, the network 300 includes server systems 301A through 301C, storage systems 302A through 302C, a packet relay apparatus group 303 that includes packet relay apparatuses 200A through 200F, a network system 304, and a routing system 305. Note that a single VLAN or a plurality of VLANs is formed by the network system 300.

The server systems 301A through 301C may be information processing apparatuses, such as, a server, a host-computer or the like and are connected with any of the packet relay apparatuses 200A through 200F. The storage systems 302A through 302C may be storage apparatuses that store data used by the server systems 301A through 301C and are connected with any of the packet relay apparatuses 200A through 200F. The network system 304 may be an apparatus for maintenance and/or monitoring of the network 300 and are connected with the packet relay apparatus 200E in the example illustrated in FIG. 3. The routing system 305 relays the transmission/reception of the packets between the network 300 and another network/the other networks. The routing system 305 is connected with the packet relay apparatus 200F in the example illustrated in FIG. 3.

Each of the packet relay apparatuses 200A through 200F may be connected with any of the rest of the packet relay apparatuses 200A through 200F, the server systems 301A through 301C, and the storing systems 302A through 302C. Moreover, each of the packet relay apparatuses 200A through 200F relays the packets transmitted/received between the rest of the packet relay apparatuses 200A through 200F, the server systems 301A through 301C, and the storing systems 302A through 302C.

Note that the example of the configuration of the network 300 illustrated in FIG. 3 is just one example, and configurations of the network to which the packet relay apparatuses 200A through 200F according to the second embodiment are applicable are not limited to the example of the configuration illustrated in FIG. 3. For example, FIG. 3 discloses a case where the network 300 includes three (3) server systems 301A through 301C, three (3) storing systems 302A through 302C and so on. However, the present invention is not limited thereto. The network 300 may include four (4) or more server systems 301 and one (1) storing system 302.

Figure 4:
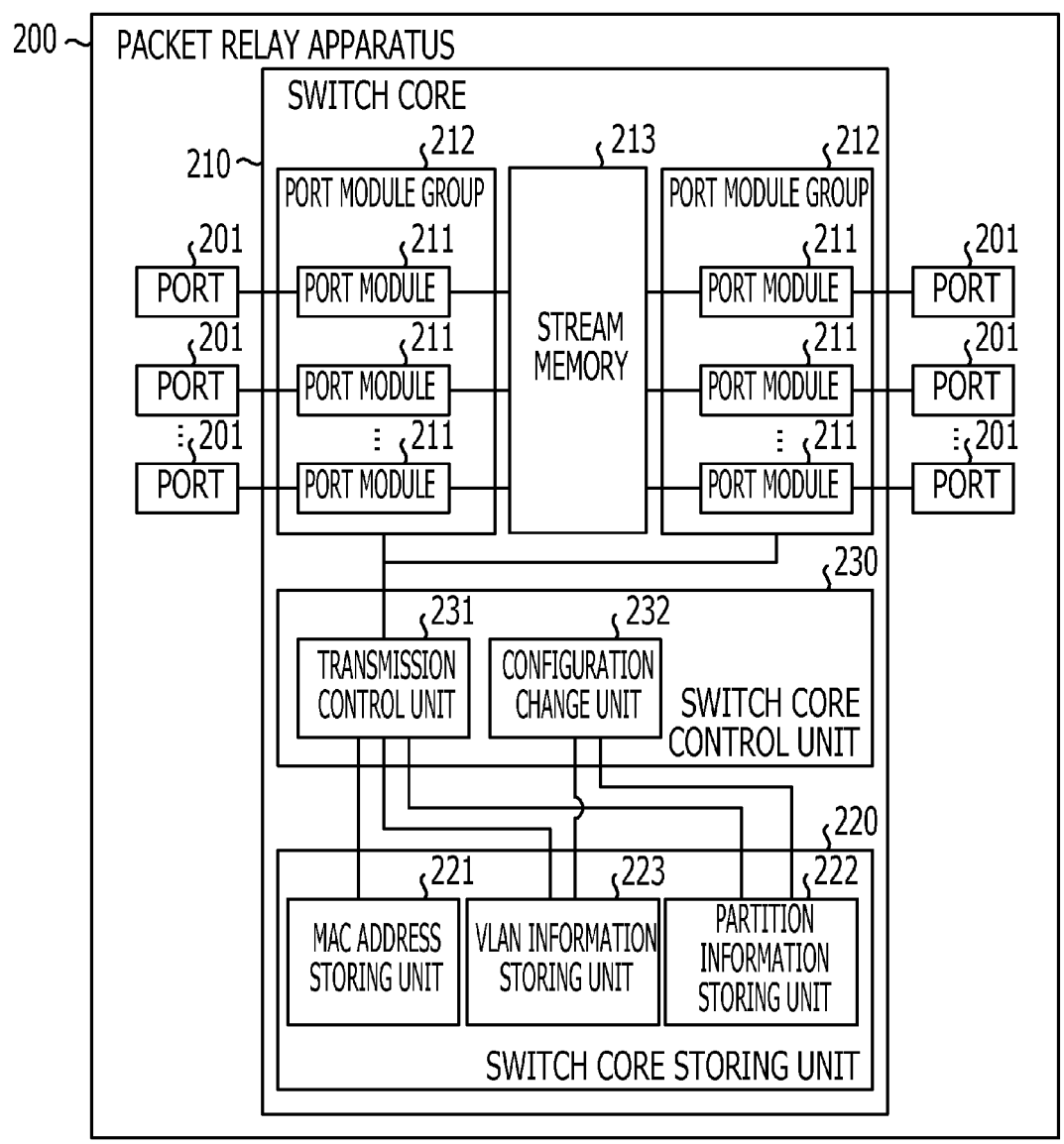
FIG. 4 illustrates a block diagram for explaining one example of configuration of the packet relay apparatus according to the second embodiment.

Next, one example of a configuration of the packet relay apparatus 200 according to the second embodiment will be disclosed with reference to FIG. 4. FIG. 4 is a block diagram for explaining one example of the configuration of the packet relay apparatus according to the second embodiment.

As illustrated in FIG. 4, the packet relay apparatus 200 includes a plurality of ports 201 and a switch core 210. One port 201 is connected with one port module 211 in the switch core 210. The port 201 is connected with another apparatus by using the network 300. Note that, as illustrated in FIG. 3, the apparatus connected with the port 201 is, for example, the server system 301, the storing system 302 or the like.

Upon receipt of a packet from the apparatus designated as a connection-destination with which the port 201 is connected, the port 201 transmits the received packet to the port module 211. On the other hand, upon receipt of a packet from the port module 211, the port 201 transmits the packet to the apparatus designated as the connection-destination with which the port 201 is connected.

Figure 5:
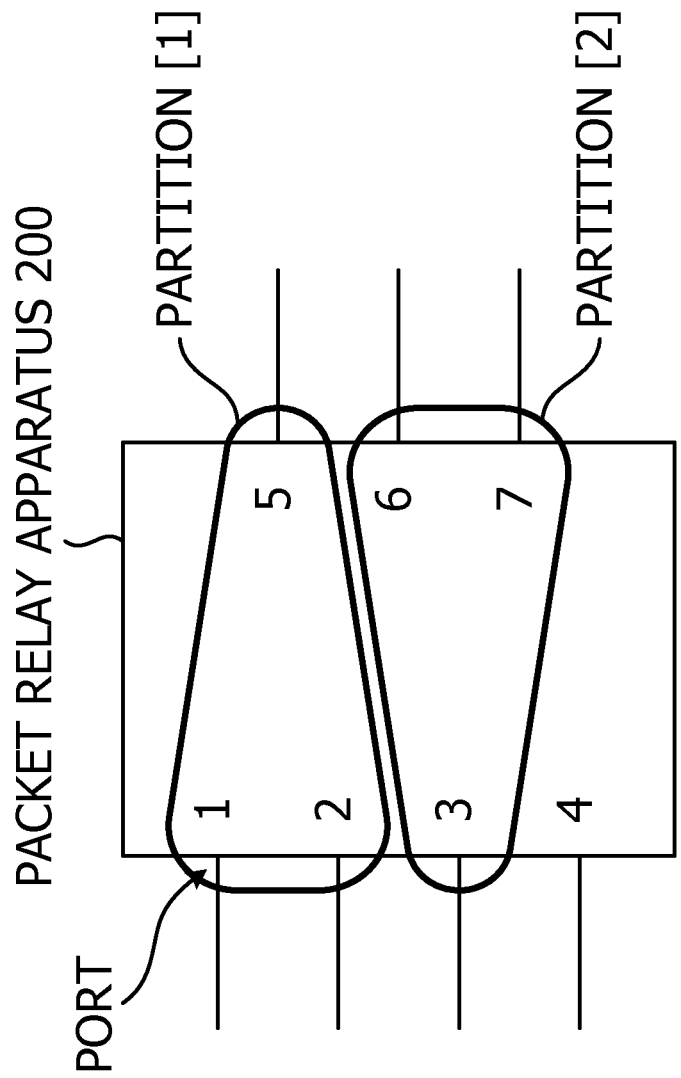
FIG. 5 illustrates a diagram for explaining ports according to the second embodiment.

Note that, hereinafter, unless otherwise mentioned, as illustrated in FIG. 5, the description is made for a case where the packet relay apparatus 200 is provided with seven (7) ports 201, that is, port [1] through port [7], in the second embodiment. As illustrated in FIG. 5, the description is made, as an example, for a case where the user configures two (2) partitions, that is, a partition [1] that includes the ports [1], [2], and [5] and a partition [2] that includes the ports [3], [6], and [7], for the packet relay apparatus 200, in the second embodiment. Moreover, the description is made, as an example, for a case where the port [4] is not used. Note that FIG. 5 is a diagram for explaining the ports in the second embodiment.

As disclosed above, the second embodiment discloses a case where there are configured 7 ports 201 and 2 partitions. However the present invention is not limited to thereto. For example, the number of ports 201 may be less than 7 or eight (8) or more. Moreover, for example, the number of partitions may be one (1) or equal to or above three (3), and the ports 201 included in the partition may be different from the one disclosed above.

The switch core 210 is connected with each of the plurality of ports 201 and transmits/receives data by using the ports 201. More specifically, as will be disclosed hereinafter, in response to receipt of a packet by one port 201, the packet is transmitted from another port 201 that is different from the reception port. Note that it is also possible that the packet is transmitted from the reception port.

The switch core 210 includes a stream memory 213, a plurality of port modules 211, a switch core storing unit 220, and a switch core control unit 230, in the example illustrated in FIG. 4.

The stream memory 213 temporarily stores a packet relayed by the packet relay apparatus 200. More specifically, the packet received by the packet relay apparatus 200 is stored until the packet is transmitted. Note that the packet stored by the stream memory 213 is the packet having been received by the port 201 and is stored by the port module 211. Moreover, the packet stored by the stream memory 213 is the packet having been read by the port module 211 and is transmitted by the port 201. The packet stored by the stream memory 213 is deleted when, for example, the packet is read by the port module 211 or when the packet is read and thereafter another packet is stored thereon by packet over-writing.

One port module 211 is connected with one of the plurality of ports 201. In other words, each port module 211 is provided with respect to each port 201, in the example illustrated in FIG. 4. For example, when there are 7 ports 201, there are 7 port modules 211 as well. Note that the description is made for a case where the number of port modules 211 is equal to the number of the ports 201, in the second embodiment. However, the present invention is not limited thereto. The number of the port modules 211 may be different therefrom. For example, only one (1) port module 211 may be provided relative to the plurality of ports 201.

Each of the plurality of port modules 211 is connected with the stream memory 213 and transmission control unit 231 in the switch core control unit 230. Note that, for the descriptive purpose, a connection relationship between each of the plurality of port modules 211 and the switch core control unit 230 is illustrated in FIG. 4 in the following manner: the plurality of port modules 211 are brought together into port module groups 212, so that FIG. 4 illustrates a connection relationship between the port module groups 212 and the switch core control unit 230. That is to say, for the descriptive purpose, the connection between the port module groups 212 and the switch core control unit 230 indicates that each of the plurality of port modules 211 is connected with the switch core control unit 230, in FIG. 4.

Upon receipt of a packet from the port 201, the port module 211 stores the received packet in the stream memory 213. The port module 211 identifies reception port information which is port information for identifying the reception port having received the packet. For example, one module 211 identifies one port 201 connected with the corresponding port module 211. Next, the port module 211 transmits the reception port information and header information of the received packet, to the transmission control unit 231.

The header information transmitted from the port module 211 to the transmission control unit 231 includes, for example, a destination address (DA, such as, a destination media access control (MAC) address), a source address (SA, such as, a source MAC address), the VLAN information or the like. The DA is information that identifies an apparatus designated as a transmission destination thereof. On the other hand, the SA is information that identifies an apparatus designated as a transmission source thereof. Moreover, the VLAN information (also referred to as a "VLAN number" or a "VLAN ID") included in the header information is information that identifies a VLAN to which the transmission source apparatus belongs. The VLAN information is also referred to as "reception VLAN information."

For example, the port module 211 transmits a piece of reception port information [1], a DA [00:01:02:03:04:05], and a piece of reception VLAN information [1], to the transmission control unit 231. Note that the piece of reception port information [1] indicates that its reception port is the port [1].

Upon receipt of a relay instruction from the transmission control unit 231, the port module 211 reads a packet stored in the address designated by the relay instruction, from among the packets stored in the stream memory 213 and transmits the packet to the port 201. Next, the port 201 further transmits the packet received from the port module 211. That is to say, the packet relay apparatus 200 transmits the received packet, to another apparatus.

The switch core storing unit 220 is connected with the switch core control unit 230 and stores information used for a variety of control processing carried out by the switch core control unit 230. The switch core storing unit 220 includes a MAC address storing unit 221, a partition information storing unit 222, and a VLAN information storing unit 223, in the example illustrated in FIG. 4. Note that the partition information storing unit 222 according to the second embodiment corresponds to the partition information storing unit 111 according to the first embodiment. In addition, the VLAN information storing unit 223 according to the second embodiment corresponds to the VLAN information storing unit 112 according to the first embodiment.

Although detailed description is not made in the embodiments, the switch core storing unit 220 typically includes a tag memory for storing control information that controls the stream memory 213. More specifically, the tag memory stores information for identifying addresses in the stream memory 213 storing the packets, with respect to each packet stored by the port module 211 in the stream memory 213. The port module 211 and the switch core control unit 230 identify the packets stored in the stream memory 213 by using the tag memory.

The MAC address storing unit 221 is connected with the transmission control module 231 in the switch core control module 230. The MAC address storing unit 221 stores a correspondence between the port information and the apparatus designated as the transmission destination. For example, as illustrated in FIG. 6, the MAC address storing unit 221 stores a correspondence among a MAC address that indicates the apparatus designated as the transmission destination, the VLAN information for identifying the VLAN, to which the apparatus designated as the transmission destination belongs, and port information for identifying the port 201 connected with the apparatus designated as the transmission destination of the packet. Note that FIG. 6 is a table for explaining one example stored in the MAC address storing unit 221 according to the second embodiment.

In the example illustrated in FIG. 6, the MAC address storing unit 221 stores a correspondence among the MAC address [00:01:02:03:04:05], a piece of VLAN information [1], and a piece of port information [5]. That is to say, the MAC address storing unit 221 stores that an apparatus, which belongs to a VLAN [1] and is designated as the transmission destination of a packet for which the DA [00:01:02:03:04:05] is set, is connected with the port [5].

The information having been stored by the MAC address storing unit 221 is stored, for example, by the user who uses the packet relay apparatus 200 or is stored by the packet relay apparatus 200 each time it receives the packet. For example, upon receipt of a packet, the packet relay apparatus 200 stores an SA, included in the header information of the received packet, in the "MAC address", and stores the VLAN information of the received packet in the "VLAN information." Then, the packet relay apparatus 200 stores a correspondence among the stored MAC address, the "VLAN information", and the reception port information in the "port information".

The partition information storing unit 222 is connected with the transmission control unit 231 and a configuration change unit 232 in the switch core control unit 230. In addition, as illustrated in FIG. 7, the partition information storing unit 222 stores a correspondence between partition information for identifying the partitions configured for the packet relay apparatus 200 and the port information for identifying the ports 201 included in the partition. Note that FIG. 7 is a table for explaining one example of the partition information storing unit 222 according to the second embodiment. Note that the partition information storing unit 222 is also referred to as an "enhanced VLAN information table" and the partition information is also referred to as "enhanced VLAN information."

In the example illustrated in FIG. 7, the partition information storing unit 222 stores not only a correspondence between pieces of port information [1], [2], and [5] and a piece of partition information [1] but also a correspondence between pieces of port information [3], [6], and [7] and a piece of partition information [2]. That is to say, the partition information storing unit 222 stores that the partition [1], which includes the ports [1], [2], and [5], and the partition [2], which includes the ports [3], [6], and [7], have already been configured for the packet relay apparatus 200, in the example illustrated in FIG. 7.

Note that the example illustrated in FIG. 7 indicates a case where the partition information storing unit 222 stores sixty-four (64) pieces of the partition information. For this reason, when two (2) partitions are configured, two (2) out of the sixty-four (64) pieces of partition information are used, and as illustrated in FIG. 7, no information is stored with respect to the pieces of partition information [3] through [64]. Note that the second embodiment discloses a case where the partition information storing unit 222 stores the 64 pieces of partition information. However, the present invention is not limited thereto. The number of pieces of partition information may be less than 64 or equal to or more than 65.

In addition, the information stored in the partition information storing unit 222 is stored or deleted by the configuration change unit 232, as will be disclosed below. The information stored in the partition information storing unit 222 is used by the transmission control unit 231.

The VLAN information storing unit 223 is connected with the transmission control unit 231 and the configuration change unit 232 in the switch core control unit 230. Moreover, as illustrated in FIG. 8, the VLAN information storing unit 223 stores a correspondence between the VLAN information and the port information for identifying the port 201 used for the transmission/reception of the packet. More specifically, the VLAN information storing unit 223 stores all pieces of the port information, stored by the partition information storing unit 222, as the port information. Note that FIG. 8 is a table for explaining one example of the VLAN information storing unit 223 according to the second embodiment.

With reference to FIG. 8, the description is made, as an example, for a case where the partition [1] which includes the ports [1], [2], and [5] and the partition [2] which includes the ports [3], [6], and [7] have already been configured. In other words, as illustrated in FIG. 7, the description is made, as an example, for the case where the partition information storing unit 222 stores not only the correspondence between the pieces of port information [1], [2], and [5] and the partition information [1] but also stores the correspondence between the pieces of port information [3], [6], and [7] and the partition information [2]. Note that the example illustrated in FIG. 8 indicates a case where the number of pieces of the VLAN information is four thousand and ninety-five (4095). In other words, the description is made, as an example, for a case where the maximum number of VLANs is four thousand and ninety-five (4095).

As illustrated in FIG. 8, the VLAN information storing unit 223 stores the pieces of port information [1], [2], and [5] and the pieces of port information [3], [6], and [7] with respect to each piece of the VLAN information. In other words, the VLAN information storing unit 223 stores that the ports [1], [2], [5], [3], [6], and [7] are used for the transmitting/receiving the packets from all the VLANs. That is to say, the received packet(s) is transmitted whatever is the piece of VLAN information, in the ports [1], [2], [5], [3], [6], and [7].

In addition, the information stored by the VLAN information storing unit 223 is stored or deleted by the configuration change unit 232. For example, in response to the configuration of the partitions provided by the user, the configuration change unit 232 stores the correspondence between the port information for identifying the ports 201 included in the partition and the VLAN information in the VLAN information storing unit 223. Moreover, the information stored by the VLAN information storing unit 223 is used by the transmission control unit 231.

The switch core control unit 230 is connected with the switch core storing unit 220 and the port modules 211. The switch core control unit 230 includes the transmission control unit 231 and the configuration change unit 232, in the example illustrated in FIG. 4. In addition, the transmission control unit 231 and the port modules 211 according to the second embodiment correspond to the identification unit 121 according to the first embodiment. In addition, the transmission control unit 231 according to the second embodiment corresponds to the determination unit 122 and the transmission unit 123 according to the first embodiment.

The transmission control unit 231 is connected with the port modules 211, the MAC address storing unit 221, the partition information storing unit 222, and the VLAN information storing unit 223. Note that since an example of the detailed processing flow by the transmission control unit 231 will be disclosed below, the explanation thereof is omitted here.

The transmission control unit 231 receives the reception port information and the header information of the packet, from the port modules 211. For example, the transmission control unit 231 receives the piece of reception port information [1], the DA [00:01:02:03:04:05], and the piece of reception VLAN information [1].

Hereinafter, a method where the transmission control unit 231 acquires a piece of port information as to the port 201 which transmits the packet by using the MAC address storing unit 221 will be disclosed. Note that the description is made, as an example, for a case where the transmission control unit 231 receives the piece of reception port information [1], the DA [00:01:02:03:04:05], and the piece of reception VLAN information [1].

The transmission control unit 231 acquires transmission port information for identifying the port transmitting the packet by using the MAC address storing unit 221. More specifically, the transmission control unit 231 acquires port information that corresponds to the header information acquired by referencing the MAC address storing unit 221. In the example illustrated in FIG. 6, the transmission control unit 231 acquires the piece of port information [5] that corresponds to a combination of the DA [00:01:02:03:04:05] and the piece of VLAN information [1].

Note that the description is made for the method of identifying the port 201 transmitting the packet by using the MAC address storing unit 221. However, the present invention is not limited thereto. For example, it is also possible that the transmission control unit 231 identifies the port(s) 201 included in the partition corresponding to the reception port, from the partition information storing unit 222, and identifies the identified port(s) 201, as the port 201 transmitting the packet.

The transmission control unit 231 determines whether the transmission port information is included in the port information corresponded to the reception VLAN information and stored in the VLAN information storing unit 223 or not. For example, in the example illustrated in FIG. 8, when the reception VLAN information is [1], the transmission control unit 231 identifies the pieces of port information [1], [2], [5], [3], [6], and [7] and determines whether the reception port information is included in the identified pieces of port information or not. For example, when the transmission port information is [5], the transmission control unit 231 determines that the reception port information is included therein.

Note that, as disclosed above, the VLAN information storing unit 223 stores all pieces of the port information, stored by the partition information storing unit 222, as the port information, in advance, so that the transmission control unit 231 determines that the reception port information is included therein, in the second embodiment.

In addition, the transmission control unit 231 determines whether the port information acquired by using the MAC address storing unit 221 is included in the port information corresponded to the reception port information and stored in the partition information storing unit 222 or not. That is to say, the transmission control unit 231 determines whether the reception port and the port 201 transmitting the packet are both included in the same partition or not.

For example, the transmission control unit 231 acquires the partition information corresponding to the reception port information, from the partition information storing unit 222. In the example illustrated in FIG. 7, the transmission control unit 231 acquires the piece of partition information [1] corresponding to the piece of reception port information [1]. Then, the transmission control unit 231 acquires the pieces of port information [1], [2], and [5] corresponded to the piece of partition information [1]. Here, since the acquired pieces of port information is [1], [2], and [5] and the piece of transmission port information [5] is included in the acquired port information, the transmission control unit 231 determines that the transmission port information is included therein.

In response to the determination that the transmission port information is included in the port information corresponded to the reception VLAN information and stored in the VLAN information storing unit 223, when the reception port and the port transmitting the packet (hereinafter, referred to as a "transmission port") are both included in the same partition, the transmission control unit 231 transmits the packet, for example, from the port [5]. On the other hand, in response to the determination that the transmission port information is not included therein, in other words, in response to the determination that the reception port and the transmission port are not included the same partition, the packet is not transmitted but, for example, discarded by the transmission control unit 231.

When the transmission control unit 231 transmits a packet, for example, the transmission control unit 231 transmits the relay instruction to the port module 211 connected with the port 201 in connection with the apparatus designated as the transmission destination of the packet. For example, when the transmission control unit 231 transmits packets respectively from the port [5], the transmission control unit 231 transmits the relay instruction to the port module 211 connected with the port [5]. Thereafter, the port module 211 reads the packet from the stream memory 213 and transmits the packet to the port 201 connected with the corresponding port module 211, and the packet is transmitted from the port 201.

The configuration change unit 232 is connected with the partition information storing unit 222 and the VLAN information storing unit 223. In response to process timing, for example, upon receipt of configuration contents from the user, the configuration change unit 232 stores or deletes the port information in/from the partition information storing unit 222 and/or the VLAN information storing unit 223 depending on the received configuration contents. Note that the configuration change unit 232 is also referred to as a "port information storing unit" or a "port information deletion unit."

The term "configuration contents" means information, for example, for identifying a piece of port information in newly storing or deleting the piece of port information to the partition information storing unit 222 and/or the VLAN information storing unit 223.

Further description of the configuration change unit 232 is made, as an example, for a case where a piece of port information is newly stored in the partition information storing unit 222 and the VLAN information storing unit 223. Note that the case where the port information is newly stored in the partition information storing unit 222 and the VLAN information storing unit 223 is such cases, for example, where a new partition is configured, a new port 201 is added to an existing partition, and so on. Hereinafter, the case where the new partition is configured is disclosed, as an example.

The configuration change unit 232 receives port information included in the new partition to be configured for the packet relay apparatus 200. Next, the configuration change unit 232 stores the received port information in the VLAN information storing unit 223, and thereafter the configuration change unit 232 stores the received port information in the partition information storing unit 222.

The description is made, as an example, for a case where the configuration change unit 232 newly configures the partition [2] which includes the ports [3], [6], and [7], while only the partition [1] has already been configured for the packet relay apparatus 200. In other words, the description is made for a case where the partition information storing unit 222 stores only the information as to the partition information [1] and the VLAN information storing unit 223 stores correspondences between the port information [1], [2], and [5] and the respective pieces of VLAN information.

For example, the configuration change unit 232 receives the pieces of port information [3], [6], and [7], as the configuration contents, from the user. Then, the configuration change unit 232 first stores the pieces of port information [3], [6], and [7] in the VLAN information storing unit 223. More specifically, the configuration change unit 232 stores correspondences between the pieces of port information [3], [6], and [7] and the respective pieces of VLAN information. In the example illustrated in FIG. 8, the pieces of port information [3], [6], and [7] are stored with respect to each piece of VLAN information [1] through [4095]. Thereafter, the configuration change unit 232 stores the pieces of port information [3], [6], and [7] in the partition information storing unit 222. For example, the configuration change unit 232 stores a correspondence between the pieces of port information [3], [6], and [7] and an unused piece of partition information [2].

As to the configuration change unit 232, further description is made, as an example, for a case where the port information is deleted from the partition information storing unit 222 and the VLAN information storing unit 223. Note that the case where the port information is deleted from the partition information storing unit 222 and the VLAN information storing unit 223 means, for example, cases where the existing partition is deleted, a part of the ports 201 included in the existing partition is deleted from the partition, and so on. Hereinafter, the description is made, as an example, for a case where the port [1] is deleted from the existing partition [1].

The configuration change unit 232 receives the port information for identifying the port 201 to be deleted from the existing partition [1]. For example, the configuration change unit 232 receives the piece of port information [1]. Then, the configuration change unit 232 first deletes the received port information from the partition information storing unit 232. For example, the configuration change unit 232 deletes the piece of port information [1] from the port information corresponded to the partition [1], among the pieces of port information stored in the partition information storing unit 222. Thereafter, the configuration change unit 232 deletes the received port information from the VLAN information storing unit 223. For example, the configuration change unit 232 deletes the piece of port information [1] with respect to each piece of the VLAN information. In the example illustrated in FIG. 8, the port information [1] is deleted with respect to each piece of the VLAN information [1] through [4095].

Note that since order of storing and deleting the port information by the above-disclosed configuration change unit 232 is explained in the description for an advantageous effect of the second embodiment, detailed description thereof will be omitted here.

Next, one example of the processing flows carried out by the packet relay apparatus 200 according to the second embodiment will be disclosed. Hereinafter, first of all, one example of a transmission processing flow by the transmission control unit 231 according to the second embodiment will be disclosed. Next, one example of a storing processing flow by the configuration change unit 232 according to the second embodiment will be disclosed. Then, one example of a deletion processing flow by the configuration change unit 232 according to the second embodiment will be disclosed.

Figure 9:
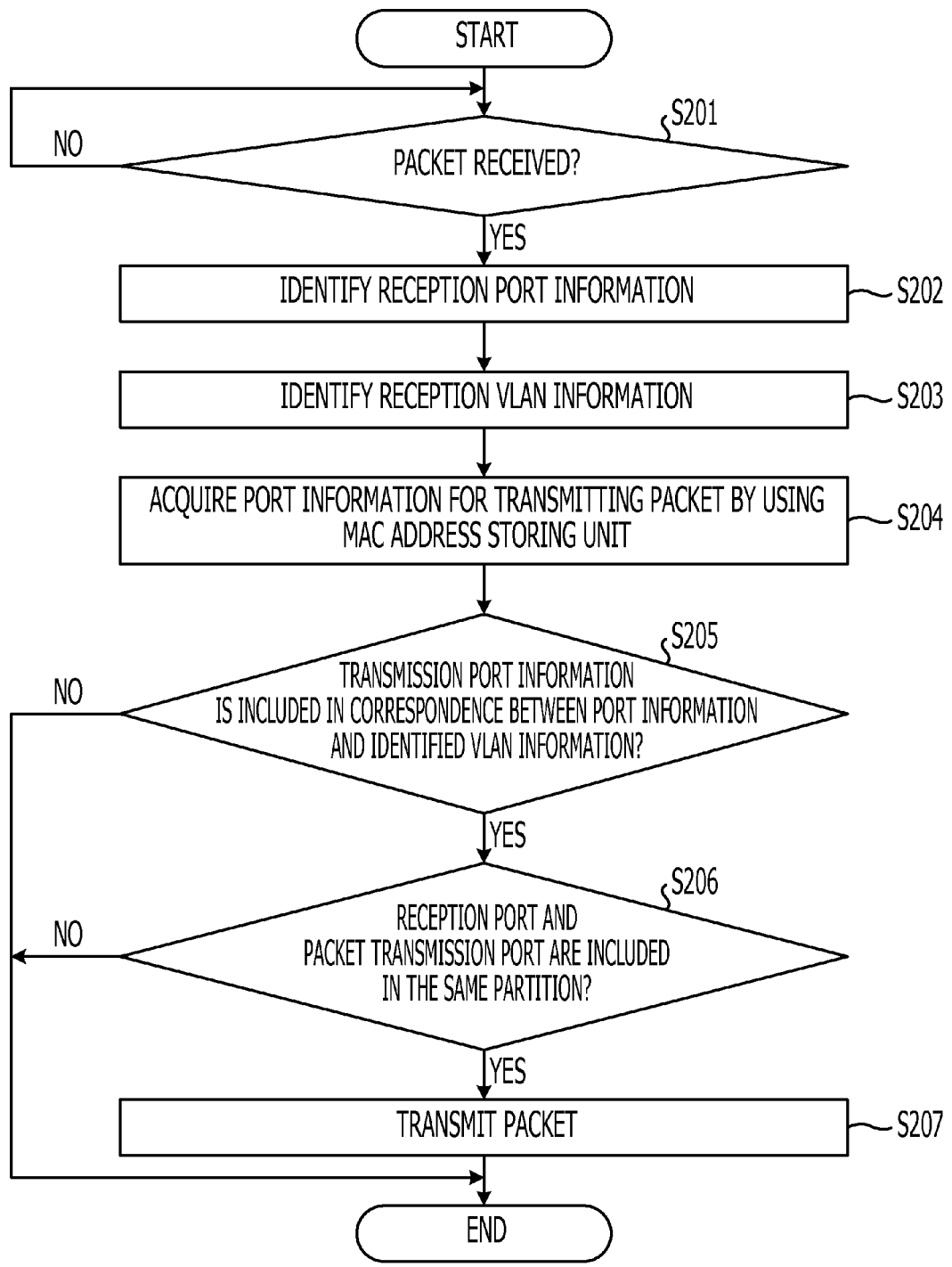
FIG. 9 illustrates a flowchart for explaining one example of a transmission processing flow by a transmission control unit according to the second embodiment.

One example of the transmission processing flow by the transmission control unit 231 according to the second embodiment will be disclosed with reference to FIG. 9. FIG. 9 illustrates a flowchart for explaining one example of the transmission processing flow carried out by the transmission control unit according to the second embodiment. Note that Operations S201 and S203 in the processing illustrated in FIG. 9 correspond to the Operations S101 and S103 in the processing illustrated in FIG. 2.

As illustrated in FIG. 9, upon receipt of a packet (Operation S201 Yes), the transmission control unit 231 identifies the reception port information (Operation S202), in the packet relay apparatus 200 according to the second embodiment.

Next, the transmission control unit 231 identifies the reception VLAN information (Operation S203). Then, the transmission control unit 231 acquires the port information for transmitting the packet by using the MAC address storing unit 221 (Operation S204). For example, when the DA included in the header information of the received packet is [00:01:02:03:04:05] and the reception VLAN information is [1], the transmission control unit 231 acquires the piece of port information [5] from the MAC address storing unit 221.

Then, the transmission control unit 231 determines whether the transmission port information is included in the port information corresponded to the identified reception VLAN information or not (Operation S205) and whether the reception port and the port 201 for transmitting the packet are included in the same partition or not (Operation S206).

Here, in response to the determination that the transmission port information is included therein (Operation S205 Yes and Operation S206 Yes), the transmission control unit 231 transmits the packet (Operation S207), for example, from the port [5]. On the other hand, the transmission control unit 231 terminates the processing without transmitting the packet in response to the determination that the transmission port information is not included therein (Operation S205 No and/or Operation S206 No).

Figure 10:
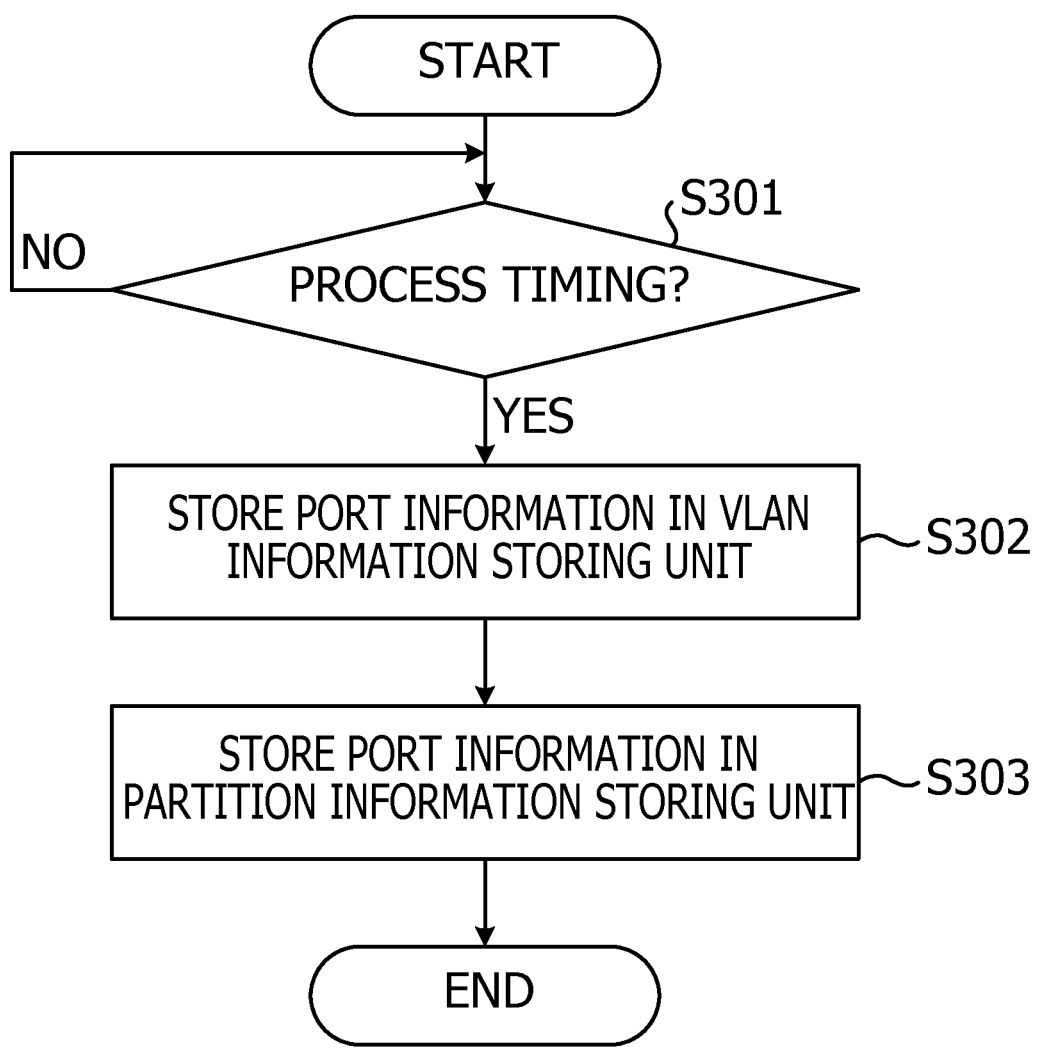
FIG. 10 illustrates a flowchart for explaining one example of a storing processing flow by a configuration change unit according to the second embodiment.

With reference to FIG. 10, one example of the storing processing flow carried out by the configuration change unit 232 according to the second embodiment will be disclosed. FIG. 10 illustrates a flowchart for explaining one example of the storing processing flow carried out by the configuration change unit according to the second embodiment. Note that, hereinafter, the description is made, as an example, for a case where a partition that includes the ports [3], [6], and [7] are newly configured.

As illustrated in FIG. 10, in response to process timing (Operation S301 Yes), the configuration change unit 232 stores the port information in the VLAN information storing unit 223 (Operation S302). For example, the configuration change unit 232 stores the pieces of port information [3], [6], and [7] with respect to each piece of VLAN information [1] through [4095] stored in the VLAN information storing unit 223.

Then, the configuration change unit 232 stores the port information in the partition information storing unit 222 (Operation S303). For example, the configuration change unit 232 stores the correspondence between the pieces of port information [3], [6], and [7] and the unused pieces of partition information [2].

Figure 11:
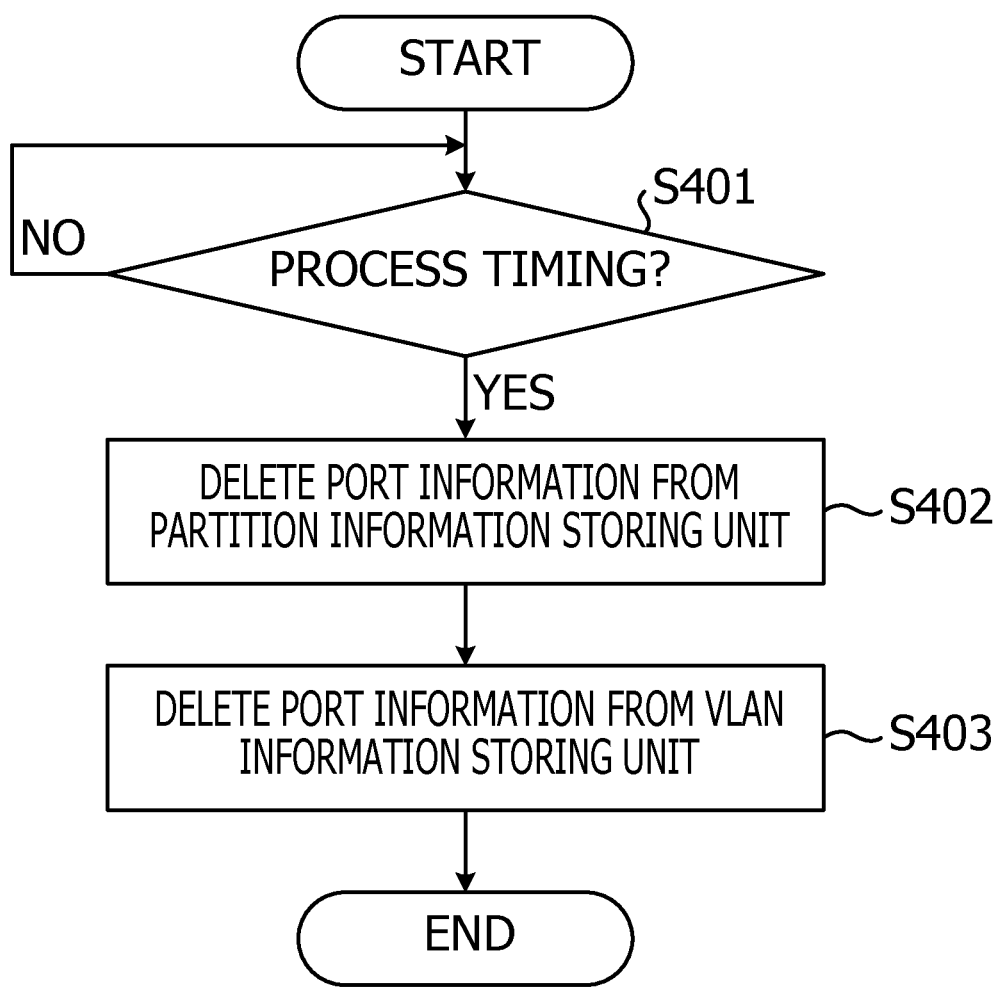
FIG. 11 illustrates a flowchart for explaining one example of a deletion processing flow by the configuration change unit according to the second embodiment.

With reference to FIG. 11, one example of the deletion processing flow carried out by the configuration change unit 232 in the second embodiment will be disclosed. FIG. 11 illustrates a flowchart for explaining one example of the deletion processing flow carried out by the configuration change unit according to the second embodiment. Note that, hereinafter, the description is made, as an example, for a case where a part of the port information included in the partition is deleted.

As illustrated in FIG. 11, in response to process timing, (Operation S401 Yes), the configuration change unit 232 deletes the port information from the partition information storing unit 222 (Operation S402). For example, the configuration change unit 232 deletes the piece of port information [1] from the pieces of port information corresponded to the partition [1], among the pieces of port information stored in the partition information storing unit 222.

Then, the configuration change unit 232 deletes the port information from the VLAN information storing unit 223 (Operation S403). For example, the configuration change 232 deletes the piece of port information [1] with respect to each piece of VLAN information [1] through [4095] stored in the VLAN information storing unit 223.

As disclosed above, according to the second embodiment, when the port information is stored in the partition information storing unit 222 and the VLAN information storing unit 223, the port information is first stored in the VLAN information storing unit 223 and thereafter the port information is stored in the partition information storing unit 222. As a result thereof, according to the second embodiment, it is possible to provide a change in the partition information storing unit 222 and the VLAN information storing unit 223 without affecting existing traffic.

More specifically, in storing the port information, first, the port information is added to the VLAN information storing unit 223, and the port information is added to the partition information storing unit 222 after completion of the storing processing performed on the VLAN information storing unit 223. As a result thereof, the storing processing performed on the VLAN information storing unit 223 has been completed at the stage where the port information is stored in the partition information storing unit 222. In consequence, it is possible to effectively reduce the case where one packet is transmitted and another packet is not transmitted depending on the packets.

Furthermore, specifically, the VLAN information storing unit 223 stores the port information with respect to each piece of VLAN information, and the number of pieces of the VLAN information is, for example, from one (1) to four thousand and ninety-five (4095). Due to this, the storing processing performed on the VLAN information storing unit 223 is not always completed immediately. As a result thereof, the method of storing the port information in the VLAN information storing unit 223 after storing the port information in the partition information storing unit 222 causes the problem that one packet is transmitted and another packet is not transmitted depending on the VLAN information of the packets during the period until the storing processing performed on the VLAN information storing unit 223 is completed. For example, with respect to the VLAN information packet on which the port information has already been stored, the packet is transmitted, while on the other hand, with respect to the VLAN information packet on which the port information is not stored yet, the packet is not transmitted. According to the second embodiment, the packets are equally not transmitted until the port information is stored in the partition information storing unit 222, and as a result, the above problem may be effectively reduced.

In addition, according to the second embodiment, when the port information is deleted from the partition information storing unit 222 and the VLAN information storing unit 223, the port information is first deleted from the partition information storing unit 222, and thereafter the port information is deleted from the VLAN information storing unit 223. As a result thereof, according to the second embodiment, it is possible to provide the change in the partition information storing unit 222 and the VLAN information storing unit 223.

More specifically, when the port information is deleted, first, the port information is deleted from the partition information storing unit 222, and thereafter the port information is deleted from the VLAN information storing unit 223. Here, the packets having been received by the deleted ports 201 are not equally transmitted at the stage where the port information is deleted from the partition information storing unit 222. In consequence, it is possible to effectively reduce the problem where one packet is transmitted and another packet is not transmitted depending on the VLAN information of the packets.

Furthermore specifically, the VLAN information storing unit 223 stores the port information with respect to each piece of the VLAN information, and the number of pieces of the VLAN information is, for example, from 1 to 4095. For this reason, the deletion processing performed on the VLAN information storing unit 223 is not always completed immediately. As a result thereof, the method of deleting the port information from the partition information storing unit 222 after deleting the port information from the VLAN information storing unit 223 causes the problem that one packet is transmitted and another packet is not transmitted depending on the VLAN information of the packets when receiving the packets in the deletion processing performed on the VLAN information storing unit 223. For example, with respect to the VLAN information packet from which the port information has already been deleted, the packet is not transmitted, while on the other hand, with respect to the VLAN information packet from which the port information is not deleted yet, the packet is transmitted. Since the packets are equally not transmitted by virtue of that the port information is first deleted from the partition information storing unit 222, above disclosed problem may be effectively reduced, according to the second embodiment.

Hereinabove, the first and the second embodiments disclose the methods that do not limit the ports 201 transmitting and receiving the packet depending on the values of the VLAN information. For example, it is disclosed the cases where the ports [1] through [3] and the ports [5] through [7] transmit/receive the packets of all pieces of the VLAN information when the partition information storing unit 222 stores the ports [1] through [3] and the ports [5] through [7].

However, the present invention is not limited thereto, and it is also possible to limit the ports 201 transmitting and receiving the packets depending on the values of the VLAN information. For example, when the user of the packet relay apparatus has enough knowledge on the VLAN, the user may provide a configuration with respect to each VLAN. In such case, it is also possible that the transmission/reception is limited depending on the VLANs (that is, different from the case where the transmission/reception of the packets is made whatever is the VLAN). For example, it is also possible that the port [5] is configured not to transmit/receive the packet of the piece of VLAN information [1]. A third embodiment discloses a method of configuring a VLAN(s) in which ports 201 for transmitting/receiving the packets is limited.

As illustrated in FIG. 12, a VLAN information storing unit 223 in a packet relay apparatus 200 according to the third embodiment stores a correspondence(s) between all pieces of port information stored by a partition information storing unit 222 and VLAN information the transmission/reception ports 201 of which are not limited. In addition, the VLAN information storing unit 223 does not store a correspondence(s) between all pieces of the port information stored by the partition information storing unit 222 and the VLAN information the transmission/reception ports 201 of which are limited but stores the correspondence(s) between the port information for identifying the port 201 used for the transmission/reception and the VLAN information the transmission/reception ports 201 of which are limited. Note that FIG. 12 is a table for explaining one example of the VLAN information storing unit according to the third embodiment.

In an example illustrated in FIG. 12, the VLAN information storing unit 223 does not store correspondences between all ports [1] through [3] and [5] through [7] and a piece of VLAN information [1] the transmission/reception ports 201 of which is limited but stores correspondences between the ports [1] through [3], [6], and [7] and the piece of VLAN information [1] the transmission/reception ports 201 of which are limited. In other words, the VLAN information storing unit 223 stores that the port [5] does not transmit/receive a packet of the piece of VLAN information [1]. Moreover, the VLAN information storing unit 223 stores correspondences between all the ports [1] through [3], [5] and [7] and a piece of VLAN information [2] the transmission/reception ports 201 of which are not limited.

Here, further description is made for the VLAN information storing unit 223. For example, as disclosed in the first and the second embodiments, the VLAN information storing unit 223 in its default configuration stores correspondences between all pieces of the port information stored by the partition information storing unit 222 and each piece of the VLAN information. Based thereon, for example, as will be disclosed below, when a user provides a configuration such that the port [5] does not transmit/receive the packet of the piece of VLAN information [1], a piece of port information [5] is deleted from the port information corresponded to the piece of VLAN information [1] by a configuration change unit 232.

The configuration change unit 232 receives the VLAN information and information for identifying the port 201, which does not transmit/receive the packet from a VLAN identified based on the VLAN information, from among the plurality of ports 201 included in a partition. For example, the configuration change unit 232 receives the port information indicating the port 201 which does not perform the transmission/reception, as the information for identifying the port 201 which does not perform the transmission/reception. For example, when the port 201 which does not perform the transmission/reception is the port [5], the configuration change unit 232 receives the piece of port information [5] and the piece of VLAN information [1], from the user.

Here, the VLAN information received by the configuration change unit 232 according to the third embodiment is the VLAN information for identifying the VLAN(s) the transmission/reception ports 201 of which are limited. Moreover, the port information received by the configuration change unit 232 is the port information for identifying the port 201, which does not transmit/receive the packet from an apparatus that belongs to the VLAN identified based on the received VLAN information, from among the plurality of ports 201 in the partition.

That is to say, reception of the piece of VLAN information [1] and the piece of port information [5] indicates that the configuration change unit 232 has received information which indicates that the port [5] does not transmit/receive the packet of a VLAN [1].

In addition, the configuration change unit 232 deletes the received port information from the pieces of port information corresponded to the received VLAN information and stored in the VLAN information storing unit 223. For example, the configuration change unit 232 deletes the piece of port information [5] from the port information corresponded to the piece of VLAN information [1].

Note that the description is made here for a case where the configuration change unit 232 receives the port information that indicates the port 201 which does not transmit/receive the packet, as the port information for identifying the port 201 which does not transmit/receive the packet. However, the present invention is not limited thereto. It is also possible that the configuration change unit 232 receives the port information that indicates the port 201 transmitting/receiving the packet and deletes the port information other than the received port information.

Hereinafter, the description is made for a case where a plurality of partitions is configured for the packet relay apparatus 200. The configuration change unit 232 does not delete the port information, included in a partition other than the one corresponding to the received port information, from the port information corresponded to the received VLAN information and stored in the VLAN information storing unit 223.

For example, the description is made for a case where the configuration change unit 232 receives the piece of VLAN information [1] and pieces of port information [1] and [2] which indicates the ports 201 transmitting/receiving the packet. The configuration change unit 232 deletes the port [5] other than the ports [1] and [2], from the ports [1], [2], and [5] included in a partition [1] corresponding to the port [1]. Here, the configuration change unit 232 does not delete the ports [3], [6], and [7] included in a partition [2].

Figure 13:
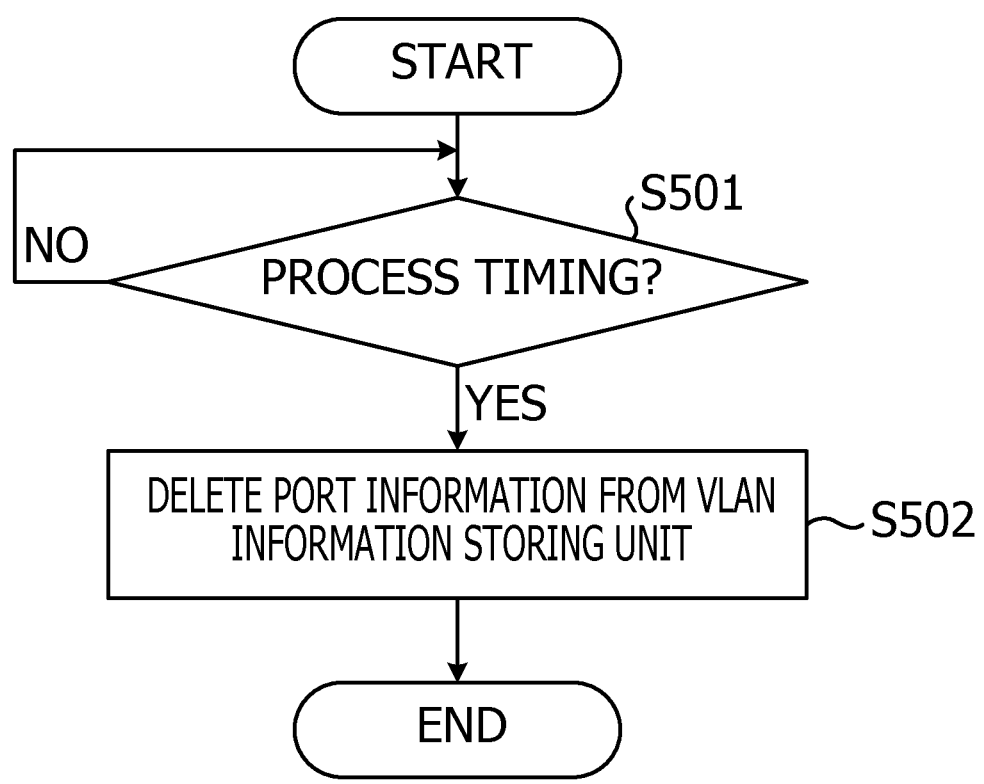
FIG. 13 illustrates a flowchart for explaining one example of a deletion processing flow by a configuration change unit according to the third embodiment.

With reference to FIG. 13, one example of a deletion processing flow carried out by the configuration change unit 232 according to the third embodiment will be disclosed. FIG. 13 illustrates a flowchart for explaining one example of the deletion processing flow carried out by the configuration change unit according to the third embodiment. Note that, hereinafter, the description is made for a case where the configuration change unit 232 receives the port information which indicates the port(s) 201 that does not transmit/receive the packet(s).

As illustrated in FIG. 13, in response to process timing (Operation S501 Yes), that is to say, for example, upon receipt of the VLAN information and the port information from the user, the configuration change unit 232 deletes the port information from the VLAN information storing unit 223 (Operation S502). More specifically, the configuration change unit 232 deletes the received port information from the port information corresponded to the received VLAN information, for example, the configuration change unit 232 deletes the piece of port information [5] from the port information corresponded to the piece of VLAN information [1] upon receipt of the piece of VLAN information [1] and the piece of port information [5] from the user.

As disclosed above, according to the third embodiment, the VLAN information and the information for identifying the port(s) 201 that does not transmit/receive the packet(s) from the VLAN(s) identified by the VLAN information, among the plurality of ports 201 included in the partition is received. Then, the configuration change unit 232 deletes the port information, identified based on the information for identifying the port(s) 201 that does not perform the transmission/reception, from the port information corresponded to the received VLAN information and stored in the VLAN information storing unit 223. As a result thereof, according to the third embodiment, it is possible to limit the port(s) 201 for the transmission/reception depending on the values of the VLAN information.

In other words, according to the third embodiment, it is possible to limit the port(s) 201 for the transmission/reception with respect to each VLAN in the partition. In consequence, it is possible to provide the configuration such that a packet is transmitted from a given port 201 among the ports 201 included in the partition, and the packet is not transmitted from the other ports 201.

That is to say, different from the existing Q-in-Q technique, it is possible to separately handle the VLAN information within the packet relay apparatus 200, and as a result thereof, as disclosed above, it is possible to limit the port(s) 201 for the transmission/reception depending on the values of the VLAN information.

In addition, according to the third embodiment, when the plurality of partitions are configured for the packet relay apparatus 200, the port information included in the partition other than the one corresponding to the received port information is not deleted from the port information corresponding to the received VLAN information. As a result thereof, according to the third embodiment, the port(s) 201 for the transmission/reception may be limited depending on the values of the VLAN information without affecting the other partition(s).

Figure 14:
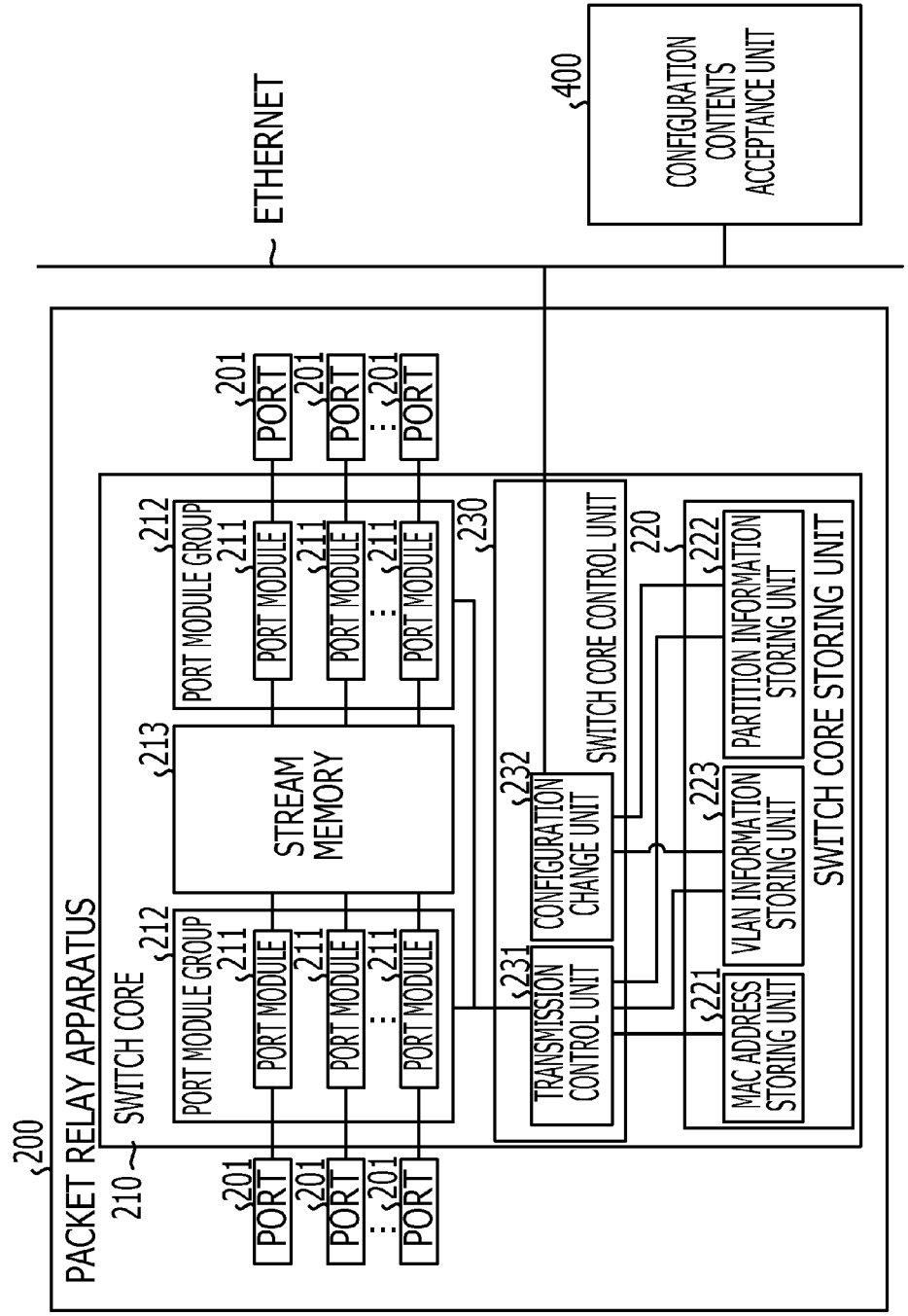
FIG. 14 illustrates a block diagram for explaining one example of a configuration of a packet relay apparatus according to a fourth embodiment.

Hereinabove, the description is made, in the first and the second embodiments, for the cases where the configuration change unit 232 receives the configuration contents from the user. However, the present invention is not limited thereto. As illustrated in FIG. 14, the packet relay apparatus 200 may further include a configuration contents acceptance unit 400 that accepts configuration contents from the user, and the configuration change unit 232 may receive the configuration contents from the configuration contents acceptance unit 400. FIG. 14 illustrates a block diagram for explaining one example of a configuration of a packet relay apparatus according to a fourth embodiment.

Hereinafter, the description is made for a case where a configuration contents acceptance unit 400 accepts configuration contents from a user, and a configuration change unit 232 receives the configuration contents that are provided by the user, from the configuration contents acceptance unit 400. In addition, the description is made, as will be disclose below, for a case where the configuration contents acceptance unit 400 transmits the configuration contents from the user, all at once, to the configuration change unit 232, in the above disclosed operation.

As illustrated in FIG. 14, a packet relay apparatus 200 is connected with the configuration contents acceptance unit 400, for example, by using Ethernet (registered trademark).

The configuration contents acceptance unit 400 is connected with the configuration change unit 232 in the packet relay apparatus 200. The configuration contents acceptance unit 400 is achieved by using a processing device, such as, a central processing unit (CPU) or the like provided separately from the packet relay apparatus 200. In addition, the configuration contents acceptance unit 400 and the packet relay apparatus 200 are, for example, connected by using Ethernet (registered trademark).

Upon receipt of configuration contents for a VLAN information storing unit 223 and/or a partition information storing unit 222 from a user, the configuration contents acceptance unit 400 transmits the received configuration contents to the configuration change unit 232 provided in the packet relay apparatus 200, all at once.

For example, the configuration contents acceptance unit 400 brings the configuration contents together by using formats as illustrated in FIG. 15 and transmits the configuration contents, all at once. FIG. 15 is a table for explaining one example of a configuration contents format which is transmitted by the configuration contents acceptance unit according to the fourth embodiment.

In the example illustrated in FIG. 15, a range of the VLAN is specified by use of a "VLAN ID End" and a "VLAN ID Start", and ports that belong to a certain VLAN are indicated by a "USE" bit vector. A "Bit Enable USE" indicates whether port information of the "USE" is valid or not and is used to effectively reduce an influence exerted on a VLAN configuration of the ports which belong to another partition. An [Extended VLAN ID] indicates information as to the partitions. An "Extended VLAN Inclusive" and an "Extended VLAN Exclusive" each indicates a port(s) added to the partition and a port(s) deleted from the partition.

The description is made as to an advantage of transmitting the configuration contents all at once. The configuration contents acceptance unit 400 transmits the configuration contents to the configuration change unit 232. For example, when a new partition is configured, configuration contents for each VLAN information stored in the VLAN information storing unit 223 are transmitted. For example, when a new partition that includes pieces of port information [3], [6], and [7] is configured, the configuration contents acceptance unit 400 transmits configuration contents, for storing the pieces of port information [3], [6], and [7], to each of the 4095 pieces of the VLAN information having been stored in the VLAN information storing unit 223.

Figure 16:
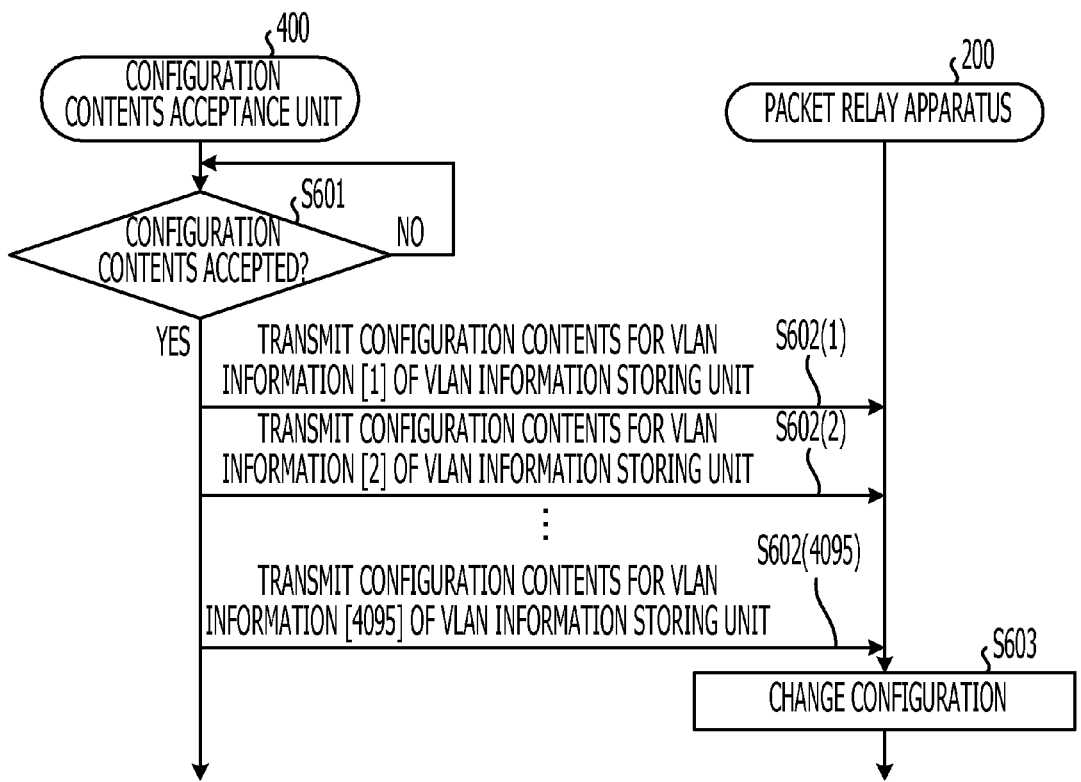
FIG. 16 is a sequence diagram for explaining a case where the configuration contents acceptance unit according to the fourth embodiment does not transmit configuration contents all at once.

For example, with reference to FIG. 16, the description is made for a case where the configuration contents acceptance unit 400 does not transmit the configuration contents all at once but separately transmits the respective configuration contents. FIG. 16 is a sequence diagram for explaining a case where the configuration contents acceptance unit according to the fourth embodiment does not transmit the configuration contents all at once.

As illustrated in FIG. 16, upon acceptance of configuration contents (Operation S601 Yes), the configuration contents acceptance unit 400 transmits the configuration contents. More specifically, as illustrated in FIG. 16, the configuration contents acceptance unit 400 transmits configuration contents for a piece of VLAN information [1] of the VLAN information storing unit 223 (Operation S602 (1)) and transmits configuration contents for a piece of VLAN information [2] of the VLAN information storing unit 223 (Operation S602 (2)). Moreover, the configuration contents acceptance unit 400 transmits the configuration contents, in order, for up to a piece of VLAN information [4095] in the VLAN information storing unit 223 (Operation S602 (4095)) in the same manner. Note that although it is not illustrated in FIG. 16, the configuration contents for the partition information storing unit 222 are also transmitted.

Thereafter, as illustrated in FIG. 16, the configuration change unit 232 changes a configuration (Operation S603), in the packet relay apparatus 200. For example, the configuration change unit 232 stores correspondences between the pieces of port information [3], [6], and [7] and each of the pieces of VLAN information [1] through [4095] in the VLAN information storing unit 223.

Figure 17:
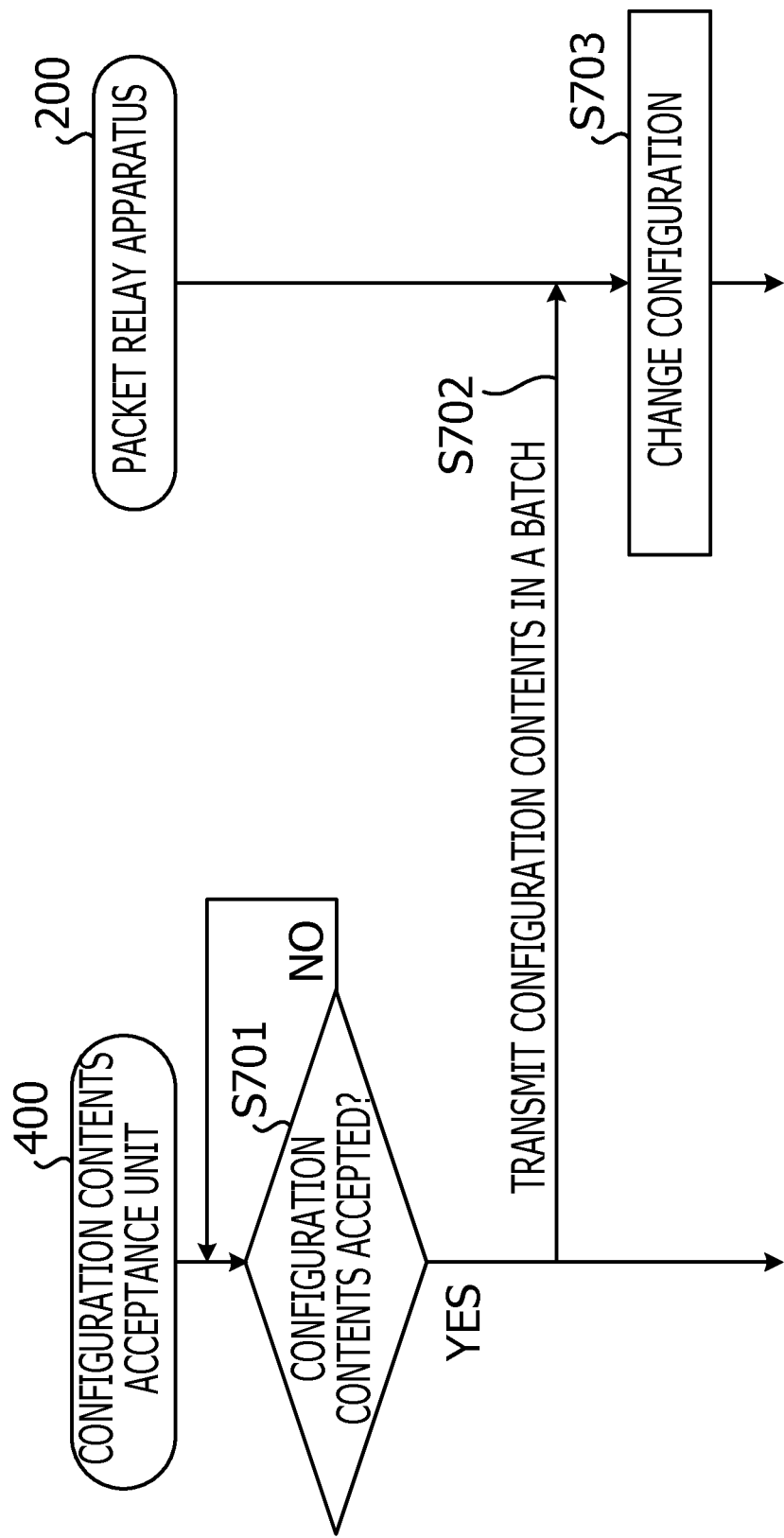
FIG. 17 is a sequence diagram for explaining a case where the configuration contents acceptance unit according to the fourth embodiment transmits the configuration contents all at once.

On the other hand, with reference to FIG. 17, the description is made for a case where the configuration contents acceptance unit 400 transmits the configuration contents all at once. FIG. 17 illustrates a sequence diagram for explaining a case where the configuration contents acceptance unit according to the fourth embodiment transmits the configuration contents all at once.

As illustrated in FIG. 17, upon acceptance of configuration contents (Operation S701 Yes), the configuration contents acceptance unit 400 transmits the configuration contents all at once (Operation S702). That is to say, as illustrated in FIG. 17, the configuration contents are not separately transmitted but transmitted all at once. Thereafter, as illustrated in FIG. 17, the configuration change unit 232 changes the configuration (Operation S703), in the packet relay apparatus 200.

As disclosed above, according to the fourth embodiment, the packet relay apparatus 200 is connected with the configuration contents acceptance unit 400. Since the configuration contents acceptance unit 400 transmits the received configuration contents to the packet relay apparatus 200 upon acceptance of the configuration contents for the VLAN information storing unit 223 and/or the partition information storing unit 222, the configuration contents are effectively transmitted to the partition information storing unit 222 and the VLAN information storing unit 223, so that the change in configuration may be effectively provided.

More specifically, for example, the packet relay apparatus 200 and the configuration change acceptance unit 400 are connected by using Ethernet (registered trademark) or the like, and it takes time for data transmission/reception. Moreover, for example, the port information is stored in the VLAN information storing unit 223 with respect to each of the 4095 pieces of the VLAN information. In consequence, it takes time for the transmission of the configuration contents when using the method separately transmitting the change in contents with respect to each thereof. For example, when connection is provided by using Ethernet (registered trademark), it takes, for example, a time of "several hundreds μs" for the transmission of, for example, only a single set of configuration contents. Thus, it takes a time of approximately "several hundreds μs×4000" for the transmission of instructions for four thousand (4000) times. For this reason, it is important to reduce latency. Since the packet relay apparatus 200 according to the fourth embodiment transmits the configuration contents all at once, it is possible to reduce the time for the configuration change as compared with the method of separately transmitting the configuration contents.

Figure 18:
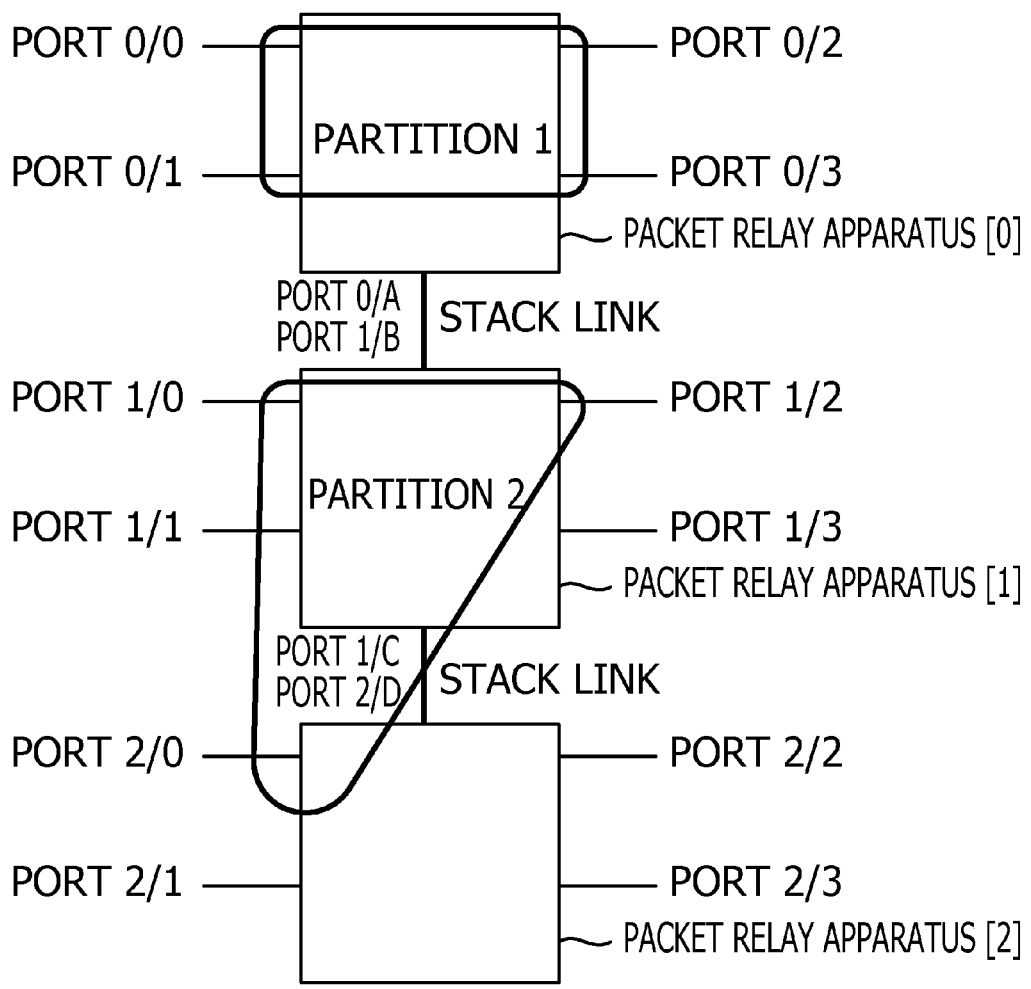
FIG. 18 illustrates a diagram for explaining a local partition and a global partition according to a fifth embodiment.

Next, the description is made for a case where a plurality of packet relay apparatuses 200 is connected with each other, and a partition that straddles the plurality of packet relay apparatuses 200 is configured in a fifth embodiment. In other words, a partition straddles a packet relay apparatus [1] and a packet relay apparatus [2] as illustrated in FIG. 18. In FIG. 18, description is made for a case where, for example, not only a local partition indicated by a partition [1] but also a global partition indicated by a partition [2] is configured, so that a transparent network is achieved thereby. Note that FIG. 18 is a diagram for explaining the local partition and the global partition according to the fifth embodiment.

Note that the local partition (also referred to as a "same-partition") means a partition in which the ports 201 included in one partition are provided within the single packet relay apparatus 200. On the other hand, the global partition (also referred to as a "no-same-partition") means a partition in which the ports 201 included in one partition are not provided within the single packet relay apparatus 200 but straddles the plurality of packet relay apparatuses 200.

Hereinafter, unless otherwise mentioned, the description is made, as an example, for a case where a packet relay apparatus [0], the packet relay apparatus [1], and the packet relay apparatus [2] are connected with each other, as illustrated in FIG. 18. In addition, hereinafter, the description is made for a case where the partition [1] that is the local partition and the partition [2] that is the global partition [2] are configured. Hereinafter, the description is made, as an example, for a case where the partition [1] includes ports [0/0], [0/1], [0/2], and [0/3]. Moreover, hereinafter, the description is made, as an example, for a case where the partition [2] includes ports [1/0], [1/1], [1/2], and [2/0].

In addition, hereinafter, the ports 201 for interconnecting the packet rely apparatuses 200 are referred to as a "stack port", and the description is made, as an example, for a case where the packet relay apparatus [1] includes stack ports [1/B] and [1/C], in the example illustrated in FIG. 18. Note that the packet relay apparatus [1] is connected with the packet relay apparatus [0] by using the stack port [1/B] and connected with the packet relay apparatus [2] by using the stack port [1/C], in the example illustrated in FIG. 18.

In the fifth embodiment, a plurality of partition information storing units 222 provided in each of the packet relay apparatuses 200 stores the same information. For example, synchronizing the respective partition information storing units 222 allows the same information to be stored in the respective partition information storing units 222.

For example, as illustrated in FIG. 19, the respective partition information storing units 222 store a correspondence between pieces of port information [0/0], [0/1], [0/2], and [0/3] and a piece of partition information [1]. In addition, the partition information storing unit 222 stores a correspondence between pieces of port information [1/0], [1/1], [1/2], and [2/0] and a piece of partition information [2]. Note that FIG. 19 is a table for explaining one example of the partition information storing unit according to the fifth embodiment.

Next, the descriptions are made in order for cases where a packet is transmitted from the stack port and a packet from the stack port is received in a transmission control unit 231 according to the fifth embodiment. Note that since the description of one example of a processing flow carried out by the transmission control unit 231 according to the fifth embodiment will be described hereinafter, the description thereof will be omitted here.

The description is made for the case where the packet relay apparatus 200 transmits the packet from the stack port. Note that the description is made, as an example, for a case where the packet is transmitted from the stack port. For example, the above example indicates a case where the packet relay apparatus [1] receives a packet from one of the ports 201 included in the partition [2] and the port 201 that transmits the packet is the port [2/0]. In this case, the packet relay apparatus [1] transmits the packet to the packet relay apparatus [2], and more specifically, the packet relay apparatus [1] transmits the packet from the stack port [1/C] connected with the packet relay apparatus [2].

The transmission control unit 231 identifies partition information corresponding to reception port information, from the partition information storing unit 222 in transmitting the packet from the stack port connected with another packet relay apparatus 200 among the plurality of ports 201. Then, the transmission control unit 231 transmits the packet to which the identified partition information is added.

For example, the description is made for a case where the port [1/0] of the packet relay apparatus [1] receives the packet. The transmission control unit 231 references the partition information storing unit 222 and acquires the partition information [2] corresponding to the reception port [1/0]. Then, the transmission control unit 231 adds the partition information [2] to the received packet and transmits the packet from the port [1/C] designated as the stack port.

Figure 20:
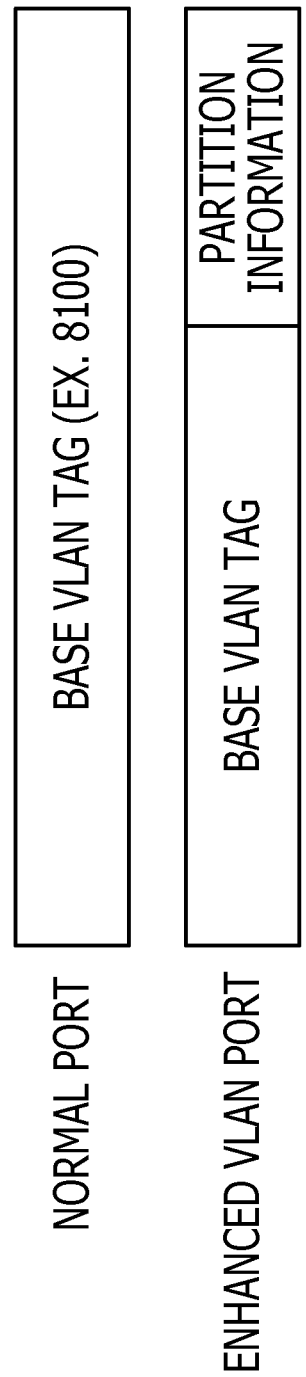
FIG. 20 illustrates a diagram for explaining one example of a tag of a packet used by a packet relay apparatus according to the fifth embodiment.

With reference to FIG. 20, further description is made as to the addition of the partition information to the packet. FIG. 20 illustrates a diagram for explaining one example of tags for packets used by the packet relay apparatus according to the fifth embodiment. For example, as illustrated in an "enhanced VLAN port" in FIG. 20, the transmission control unit 231 stores the partition information in a posterior part of a base VLAN tag. Note that, for example, VLAN information is stored in a posterior part of the partition information.

Hereinafter, the description is made for a case where the packet relay apparatus 200 receives the packet from the stack port. The transmission control unit 231 identifies the partition information added to the received packet. Then, the transmission control unit 231 identifies the port information corresponded to the identified partition information, from the partition information storing unit 222 and transmits the packet from a port 201 different from the reception port among the identified ports 201.

For example, the description is made, as an example, for a case where the packet is received from a port [2/D] connected with the packet relay apparatus [1], in the packet relay apparatus [2]. The transmission control unit 231 identifies the partition information added to the received packet, for example, identifies the piece of partition information [2]. Then, the transmission control unit 231 identifies the pieces of port information [1/0], [1/1], [1/2], and [2/0] corresponded to the partition information [2] from the partition information storing unit 222 and transmits the packet from the port [2/0]. Note that the transmission control unit 231 does not transmit the packet again from the stack port having received the packet.

Here, a brief description of the significance of adding the partition information in transmitting the packet from the stack port is made with reference to FIG. 18. The partition information is added for the following reason, that is, there may be a case where the packet relay apparatus 200 having received the packet from the stack port is unable to identify the reception port, and as a result thereof, the packet relay apparatus 200 is unable to determine the partition that the packet is included. For example, in the example illustrated in FIG. 18, if a packet is received from the stack port [2/D], it does not definitely determine that the received packet is included in the partition [2]. For example, there is a possibility that the packet the reception port of which is [1/3] is received. In this case, the received packet is the one that is not included in the partition [2].

For this reason, the transmission control unit 231 according to the fifth embodiment transmits the packet after adding the partition information to the packet when transmitting the packet from the stack port. Note that the above example discloses the case where the partition information is added. However, the present invention is not limited thereto. For example, it is also possible to add the reception port information.

Figure 21:
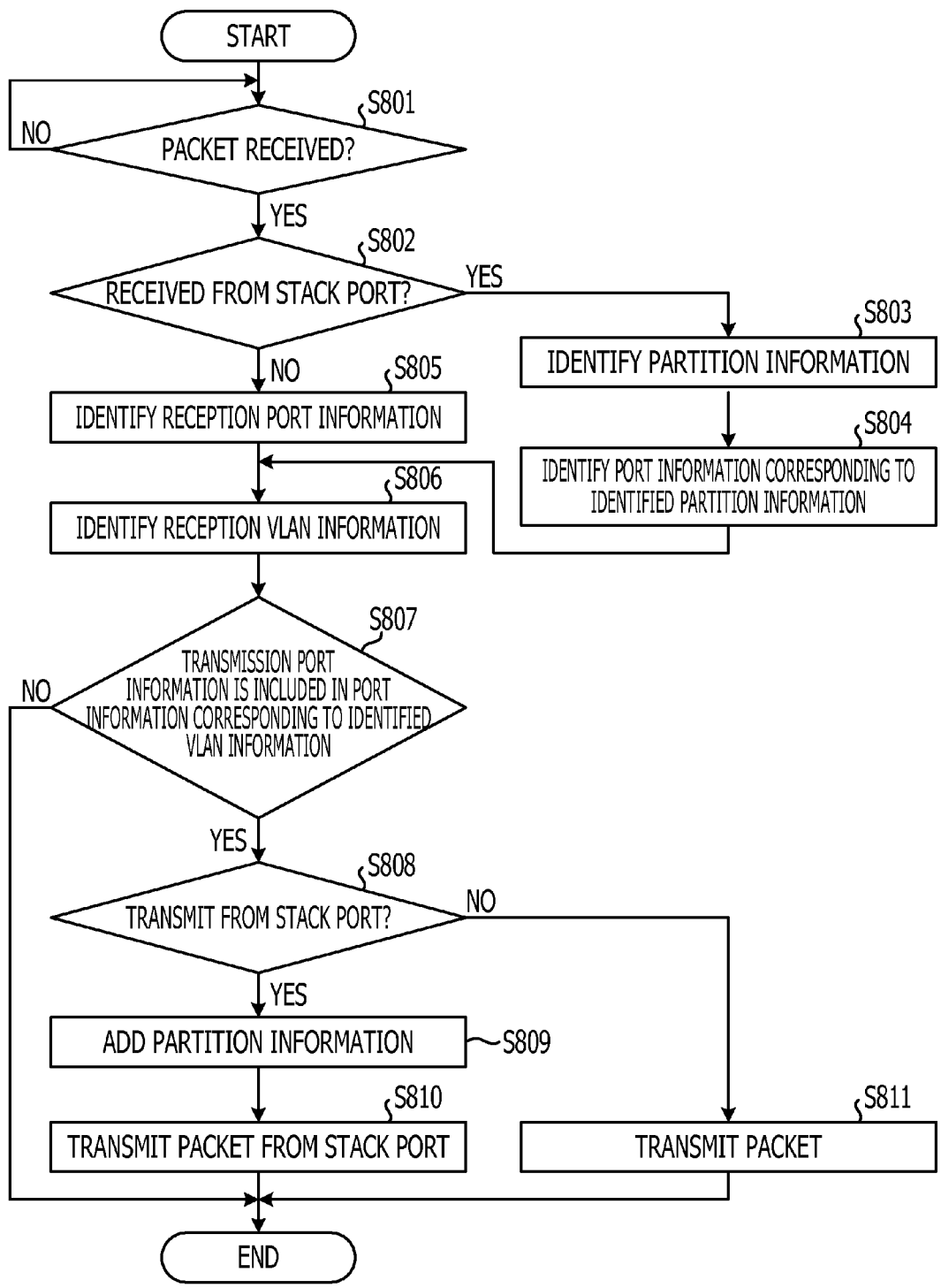
FIG. 21 illustrates a flowchart for explaining one example of a transmission processing flow by a transmission control unit according to the fifth embodiment.

Next, with reference to FIG. 21, one example of a transmission processing flow carried out by the transmission control unit 231 according to the fifth embodiment will be disclosed. FIG. 21 illustrates a flowchart for explaining one example of the transmission processing flow carried out by the transmission control unit according to the fifth embodiment. Note that Operations S801 and S806 in the processing flow in FIG. 21 each corresponds to Operations S101 and S103 in FIG. 2.

As illustrated in FIG. 21, upon receipt of a packet (Operation S801 Yes), the transmission control unit 231 according to the fifth embodiment determines whether the packet is the one received from the stack port or not (Operation S802). For example, the transmission control unit 231 of the packet relay apparatus [2] determines whether the packet is the one received from the port [2/D].

Then, in response to the determination by the transmission control unit 231 that the packet is the one received from the stack port (Operation S802 Yes), the transmission control unit 231 identifies the partition information (Operation S803), for example, identifies whether the partition information is [2] or not. Then, the transmission control unit 231 identifies the port information corresponded to the identified partition information (Operation S804), for example, identifies the pieces of port information [1/0], [1/1], [1/2], and [2/0] corresponded to the piece of partition information [2] from the partition information storing unit 222.

Then, the transmission control unit 231 determines whether the packet is transmitted from the stack port or not (Operation S808). For example, the packet relay apparatus [1] determines whether or not the ports 201 belong to a single partition includes the port 201 of another packet relay apparatus. In response to the determination that the ports 201 include the port 201 of another packet relay apparatus, the packet relay apparatus [1] determines that the packet is to be transmitted from the stack port. Then, in response to the determination that the packet is to be transmitted from the stack port (Operation S808 Yes), the transmission control unit 231 adds the partition information thereto (Operation S809) and transmits the packet from the stack port (Operation S810).

On the other hand, in response to the determination that the packet is not transmitted from the stack port (Operation S808 No), the transmission control unit 231 transmits the packet from the port 201 without adding the partition information (Operation S811).

Note that in response to the determination that the packet has not been transmitted from the stack port (Operation S802 No) in Operation S802, the transmission control unit 231 identifies the reception port information (Operation S805)

and identifies reception VLAN information (Operation S806). Then, the transmission control unit 231 determines whether or not transmission port information is included in the port information corresponded to the identified reception VLAN information (Operation S807). Then, in response to the determination that the transmission port information is included therein (Operation S807 Yes), the transmission control unit 231 executes Operation S808 disclosed above. On the other hand, in response to the determination that the transmission port information is not included therein (Operation S807 No), the processing terminates.

As disclosed above, according to the fifth embodiment, the plurality of packet relay apparatuses 200 are connected with each other by using the stack ports. In transmitting the packet from the stack port, the transmission control unit 231 identifies the partition information, corresponding to the reception port information, from the partition information storing unit 222 and transmits the packet to which the identified partition information is added. In addition, upon receipt of the packet from the stack port, the transmission control unit 231 identifies the partition information added to the received packet. Then, the transmission control unit 231 identifies the port information, corresponded to the identified partition information, from the partition information storing unit 222, and transmits the packet from one of the ports 201 which is different from the reception port, among the identified ports 201. In consequence, according to fifth embodiment, the partition may be configured such that the partition straddles the plurality of packet relay apparatuses 200, and this allows a transparent network to be achieved.

In the fifth embodiment, the description is made for the case where respective partition information storing units 222 store the same information. In this case, the number of partitions capable of being configured for the packet relay apparatuses 200 becomes equal to the number of pieces of the partition information. For example, the maximum number of pieces of partition information becomes sixty-four (64) when the number of pieces of partition information is one (1) through sixty-four (64).

However, the present invention is not limited thereto. It is also possible to configure the number of partitions which is more than the number of pieces of partition information stored in each of the partition information storing units 222. For example, even in a case where there are 64 pieces of partition information, that is, 1 through 64, more than 64 partitions may be configured. Hereinafter, the description is made for a packet relay apparatus 200 in which it is possible to configure the number of partitions that is more than the number of pieces of partition information stored in each partition information storing unit 222. More specifically, as will disclosed hereinbelow, a method in which pieces of partition information is used by allocating the pieces of partition information for the local partition(s) or for the global partition(s).

Figure 22:
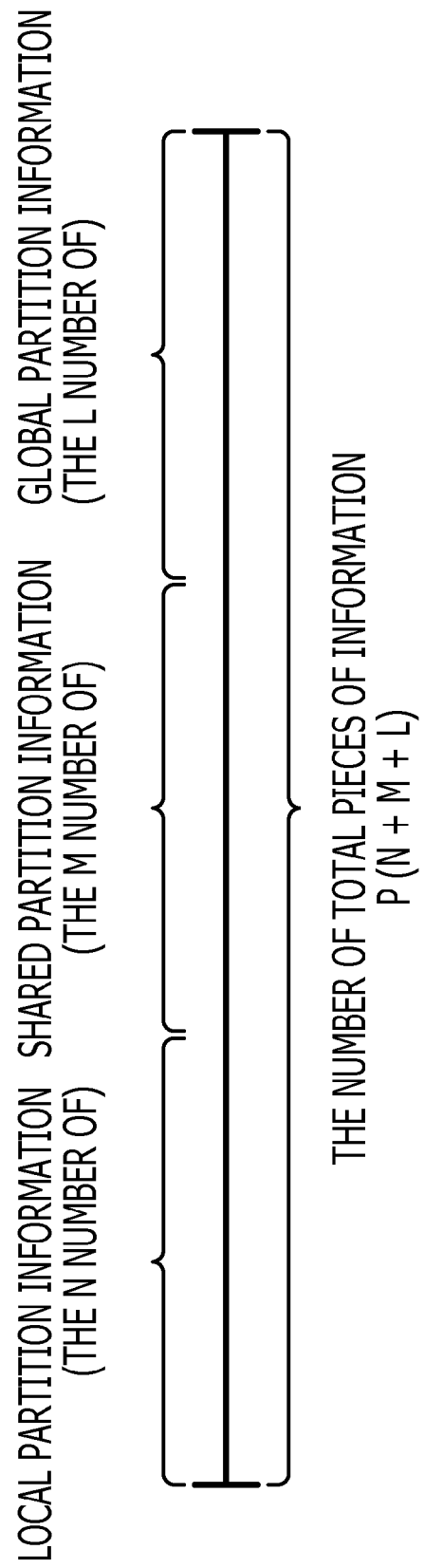
FIG. 22 illustrates a diagram for explaining types of partition information according to a sixth embodiment.

The description is made, as an example, for a case where the number of pieces of partition information stored by the partition information storing unit 222 is P, in a sixth embodiment. Note that FIG. 22 is a diagram for explaining the partition information according to the sixth embodiment. As illustrated in FIG. 22, among the "P" number of pieces of partition information, the "N" number of pieces thereof is allocated as local partition information, the "M" number of pieces thereof is allocated as shared partition information, and the "L" number of pieces thereof is allocated as global partition information, in the sixth embodiment, respectively. Note that P is equal to (=) "N" plus (+) "M" plus (+) "L."

Note that the local partition information is partition information used for the local partition. In other words, it indicates that each packet relay apparatus 200 is capable of configuring the "N" number of partitions, each of which only includes the ports 201 within the same packet relay apparatus 200. In addition, the shared partition information is partition information used for the local partition or for the global partition. Moreover, the global partition information is partition information used for the global partition. In other words, there are "L" number of pieces of partition information used in a shared manner for the plurality of packet relay apparatuses 200. This indicates that the "L" number of partitions straddling the plurality of packet relay apparatuses 200 is capable of being configured.

With reference to FIG. 23, the description is made for a relationship between the number of pieces of allocated partition information and the number of configurable partitions. FIG. 23 is a table for explaining the relationship between the number of pieces of allocated partition information and the number of configurable partitions in the sixth embodiment. The example illustrated in FIG. 23 indicates a case where the "P" representing the number of all pieces of partition information is sixty-four (64). The "N" in FIG. 23 indicates the number of pieces of local partition information. The "M" in FIG. 23 indicates the number of pieces of shared partition information. The "L" in FIG. 23 indicates the number of pieces of global partition information. In the example illustrated in FIG. 23, the example indicates a case where there are eight (8) packet relay apparatuses 200.

When the 64 pieces of partition information are all allocated for the global partition information as indicated by "N" [0], "M" [0], and "L" [64] in FIG. 23, the number of partitions becomes 64. On the other hand, when the sixteen (16) pieces of partition information is allocated for the local partition information, the sixteen (16) pieces of partition information is allocated for the shared partition information, and the thirty-two (32) pieces of partition information is allocated for global partition information, as indicated by "n" [16], "m" [16], and "l" [32] in FIG. 23, one hundred and seventy-six (176) through two hundred and eighty-eight (288) partitions are capable of being configured. That is to say, each of the 8 packet relay apparatuses 200 is capable of creating the 16 local partitions and each of which does not straddle the plurality of packet relay apparatuses. This makes it possible to create [16×8=128] local partitions. In addition, there are 32 pieces of global partition information, and thus it is possible to configure 32 global partitions. In addition, when there are 16 pieces of shared partition information and all pieces thereof are used for configuring the global partitions, it is possible to configure 16 partitions. When all of the 16 pieces of shared partition information are used for configuring the local partition, it is possible to configure [16×8=128] partitions. That is to say, it is possible to configure [128+32+(16 through 128)=176 through 288] partitions.

Note that each partition information storing unit 222 stores the partition information as to the local partitions configured within the same packet relay apparatus 200 and the partition information as to the global partition(s). In other words, the partition information as to the local partitions configured within the same partition information storing unit 200 is stored separately by the each partition information storing unit 222. Moreover, the partition information on the global partition(s) is stored in a shared manner by all partition information storing units 222.

Figure 24:
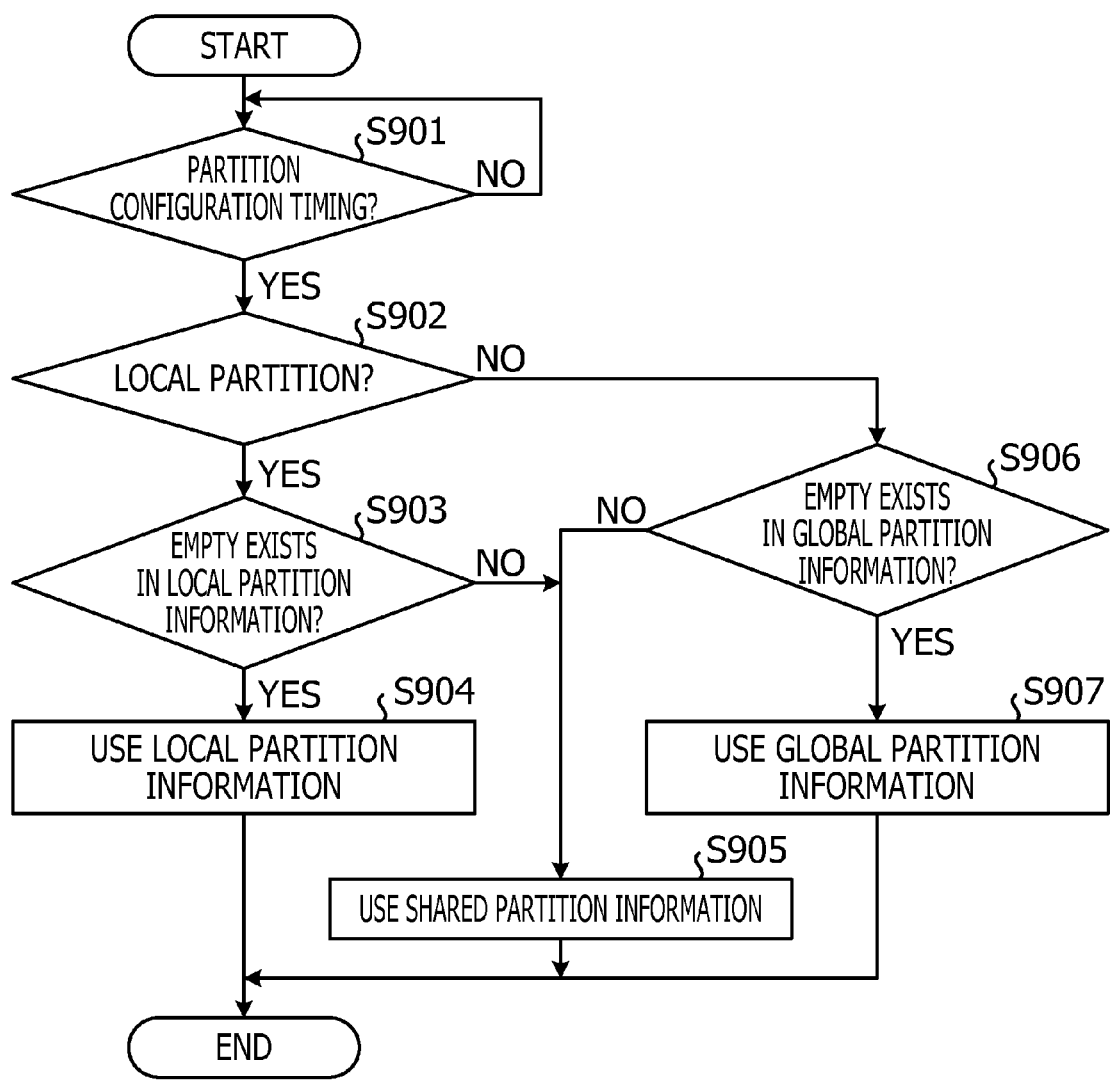
FIG. 24 illustrates a flowchart for explaining one example of a processing flow of partition information determination by a configuration change unit according to the sixth embodiment.

Next, with reference to FIG. 24, one example of a processing flow of a partition information determination carried out by the configuration change unit 232 according to the sixth embodiment will be disclosed. FIG. 24 illustrates a flowchart for explaining one example of the processing flow of the partition information determination carried out by the configuration change unit according to the sixth embodiment.

Note that, hereinafter, the description is made, as an example, for a case where 16 pieces of partition information are allocated as the local partition information, 16 pieces of partition information are allocated as the shared partition information, and 32 pieces of partition information are allocated as the global partition information.

In response to partition configuring timing (Operation S901 Yes), the configuration change unit 232 according to the sixth embodiment determines whether the partition to be configured is the local partition or not (Operation S902). That is to say, the configuration change unit 232 determines whether the partition to be configured is the one which includes only the ports 201 within the same packet relay apparatus 200 or not.

Here, in response to the determination by the configuration change unit 232 that the partition to be configured is the local partition (Operation S902 Yes), the configuration change unit 232 determines whether an empty exists with respect to the local partition information (Operation S903). That is to say, the configuration change unit 232 determines whether an empty field exists in a local partition information fields of the partition information storing unit 222 within the same packet relay apparatus 200 or not.

Then, in response to the determination that the empty exists (Operation S903 Yes), for example, when the number of pieces of local partition information in use is equal to or less than fifteen (15), the configuration change unit 232 uses the local partition information (Operation S904). That is to say, the configuration change unit 232 stores a correspondence between port information, included in a newly configured partition, and the partition information, allocated for the local partition information, among the pieces of partition information stored in the partition information storing unit 222.

On the other hand, in response to the determination that the empty does not exist (Operation S903 No), for example, when the number of pieces of local partition information in use is 16, the configuration change unit 232 uses the shared partition information (Operation S905). That is to say, the configuration change unit 232 stores a correspondence between the port information, included in the newly configured partition, and the partition information, allocated for the shared partition information, among the pieces of partition information stored in the partition information storing unit 222.

Note that, for example, when one (1) piece of shared partition information is used while the sixteen (16) pieces of local partition information has already been used, the sixteen (16) local partitions may be configured with respect to each packet relay apparatus 200.

In addition, the description is made for a case where the determination is made in the above Operation S902 that the partition to be configured is not the local partition (Operation S902 No) but the global partition. In the above case, the configuration change unit 232 determines whether or not an empty exists with respect to the pieces of global partition information (Operation S906). Then, in response to the determination that the empty exists (Operation S906 Yes), for example, when the number of pieces of global partition information in use is equal to or less than thirty-one (31), the global partition information is used (Operation S907). On the other hand, in response to the determination that the empty does not exist (Operation S906 No), the configuration change unit 232 uses the shared partition information (Operation S905).

Note that although it is not mentioned in the example illustrated in FIG. 24, when an empty does not exist with respect to the shared partition information, the processing terminates without configuring the new partition.

As disclosed above, according to the sixth embodiment, a given number of pieces of the partition information are allocated for the local partition information, the global partition information, and the shared partition information. As a result thereof, it is possible that the number of configurable partitions is made greater than the number of pieces of partition information.

Various embodiments of the present invention are disclosed hereinabove. However, the present invention may be achieved by yet another embodiment that is different from the embodiments disclosed hereinabove. Hereinafter, yet another embodiment will be disclosed.

For example, the first embodiment discloses the case where the transmission control unit 231 performs the processing by using the VLAN information stored in the VLAN information storing unit 223. However, the present invention is not limited thereto. For example, it is also possible that when a VLAN information storing unit 223 stores no correspondence between port information and VLAN information of a received packet therein, a transmission control unit 231 makes a determination on an assumption that the VLAN information storing unit 223 stores correspondences between all pieces of port information and the VLAN information.

That is to say, when the VLAN information storing unit 223 is not configured and only a part of the port information stored by a partition information storing unit 222 is stored, the transmission control unit 231 may handle the port information on the assumption that the port information included in a partition has already been stored.

As a result thereof, even if the VLAN information storing unit 223 is not yet configured, it is possible to achieve a transparent network. Moreover, it is also possible to omit a configuration processing, so that a processing load may be reduced.

Moreover, for example, the partition may be configured with respect to each reception port. More specifically, as illustrated in FIGS. 25 and 26, the partition information storing unit 222 may store the port information for identifying a plurality of ports 201 included in the partition with respect to each piece of partition information that indicates reception port information. Note that FIGS. 25 and 26 are tables for explaining one example of pieces of information stored by the partition information storing unit when the partition is configured with respect to each reception port. Note that the reception ports are indicated by associating each piece of the partition information with the corresponding reception port, for descriptive purpose, in FIGS. 25 and 26.

FIG. 25 illustrates a case where one partition that includes ports [1], [2], and [5] and the other partition that includes ports [3], [6], and [7] are configured. As illustrated in FIG. 25, the partition information storing unit 222 stores a correspondence between pieces of port information [1], [2], and [5] and the partition information [1] corresponding to a reception port [1]. Moreover, the partition information storing unit 222 stores correspondences between the pieces of port information [1], [2], and [5] and pieces of partition information [2] and [5] corresponding to reception ports [2] and [5], in the same manner. Note that FIG. 25 is the table in which the example of the information stored by the partition information storing unit 222 illustrated in FIG. 7 is modified to a form corresponded to the reception port information without changing its contents.

In addition, FIG. 26 indicates a case where the partition in response to the reception port [1] includes the ports [1] and [5], and the partition in response to the reception port [5]

includes the ports [1], [2], and [5]. As illustrated in FIG. 26, the partition information storing unit 222 stores a correspondence between the pieces of port information [1] and [5] and the partition information [1] corresponding to the reception port [1]. On the other hand, the partition information storing unit 222 stores a correspondence between the pieces of port information [1], [2], and [5] and the partition information [5] corresponding to the reception port [5].

As disclosed above, more detailed partition configuration is capable of being achieved by configuring the partitions with respect to each reception port. For example, transmission from the port [5] is possible in response to the reception of a packet by the port [1], and on the other hand, transmission from the ports [1] and [2] is possible in response to the reception of the packet by the port [5], as illustrated in FIG. 26.

Moreover, as to the global partition information, the description is made, for example, as illustrated in FIG. 19, the same information is stored in each of the partition information storing units 222 and the port information indicating the ports 201 included in the other packet relay apparatuses 200, in the fifth and the sixth embodiments. However, the present invention is not limited thereto. For example, it is also possible that each of the partition information storing units 222 stores the port information as to the ports 201 included within the same packet relay apparatus 201. That is to say, it is unnecessary to store the port information as to the ports 201 included in the other packet relay apparatus 201.

More specifically, as illustrated in FIGS. 27 and 28, when the port information included in the other packet relay apparatus 200 is not stored, the partition information storing unit 222 stores the port information that indicates a stack port. Note that FIG. 27 is a table for explaining one example of the partition information storing unit of a packet relay apparatus [1]. FIG. 28 is a table for explaining one example of the partition information storing unit of a packet relay apparatus [2].

As illustrated in FIG. 27, a partition information storing unit 222 of the packet relay apparatus [1] stores a correspondence between pieces of port information [1/0], [1/1], [1/2], and [1/C] and a piece of partition information [2] (see FIG. 18). That is to say, the partition information storing unit 222 of the packet relay apparatus [1] is unnecessary to store the port information for identifying the ports 201 of the other packet relay apparatuses 200. In addition, as illustrated in FIG. 28, a partition information storing unit 222 of the packet relay apparatus [2] stores a correspondence between pieces of port information [2/0] and [2/D] and the piece of partition information [2] (see FIG. 18). That is to say, the partition information storing units 222 of the packet relay apparatuses [1] and [2] are unnecessary to store the port information for identifying the ports 201 of the other packet relay apparatuses 200.

In addition, for example, as disclosed in the fifth and sixth embodiments, when a plurality of packet relay apparatuses 200 are connected with each other, use of topology information in combination therewith is also possible. Note that the topology information is information that indicates a connection relationship between/among the packet relay apparatuses 200.

Figure 29:
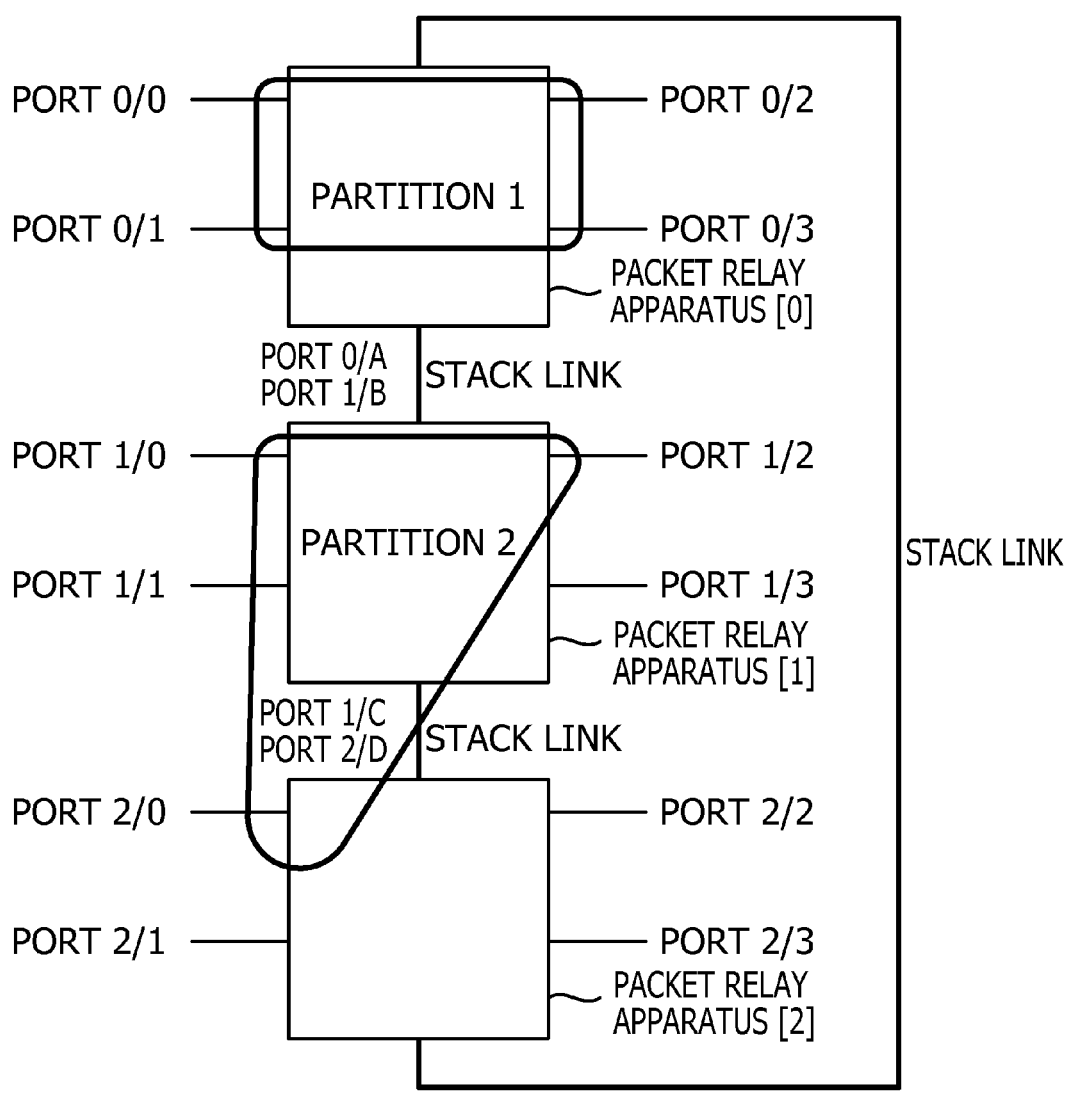
FIG. 29 illustrates a diagram for explaining a case where topology information is used.

For example, as illustrated in FIG. 29, the description is made, as an example, for a case where a packet relay apparatus [0] and the packet relay apparatus [2] are directly connected with each other. Note that FIG. 29 is a diagram for explaining the case where the topology information is used.

Each of the packet relay apparatuses 200 stores the topology information that indicates the connection relationship with the other packet relay apparatuses 200. For example, in response to a failure occurred between the packet relay apparatus [1] and the packet relay apparatus [2], the packet relay apparatus [1] references the topology information in transmitting a packet to the packet relay apparatus [2] and makes sure that a packet relay apparatus [0] and the packet relay apparatus [1] are connected with each other. It is also possible that, then, the packet relay apparatus [1] does not transmit the packet from the port [1/C] but transmits the packet from the port [1/B], and transmits, by using the packet relay apparatus [0], the packet to the packet relay apparatus [2].

Moreover, the second embodiment discloses the method, as the example, in which when there are 4095 pieces of VLAN information, the VLAN information storing unit 223 stores correspondences between all of the port information for identifying the ports 201 included in the partition and each of the 4095 pieces of VLAN information, in advance. However, the present invention is not limited thereto. It is also possible to store a correspondence(s) between all of the port information for identifying the ports 201 included in the partition and a part of the VLAN information, in advance, while on the other hand, it is unnecessary to store a correspondence(s) between all of the port information and the rest of the VLAN information.

That is to say, with respect to the VLAN in which the transparent network is desired, the correspondences between all of the port information for identifying the ports 201 included within the partition and the VLAN information are stored, in advance. For example, among the 4095 pieces of VLAN information, when the transparent network is desired with respect to the pieces of VLAN information [1] through [2000], it is also possible to store, in advance, all of the port information for identifying the ports 201 included in the partition only with respect to the pieces of VLAN information [1] through [2000]. In the above case, all of the port information is unnecessary to be stored, in advance, with respect to the pieces of VLAN information [2001] through [4095].

In addition, the second embodiment discloses the method in which the determination is made on whether the transmission port information is included in the port information corresponded to the identified reception VLAN information and stored in the VLAN information storing unit 223 or not. However, the present invention is not limited thereto. For example, it is also possible that the packet relay apparatus 200 determines, in addition thereto, whether the reception port is included in the port information corresponded to the identified reception VLAN information and stored in the VLAN information storing unit 223 or not.

For example, upon receipt of a packet, the packet relay apparatus 200 identifies the reception port information that is the port information for identifying the reception port having received the packet. Next, the packet relay apparatus 200 identifies the reception VLAN information that is the VLAN information set for the received packet and determines whether the identified reception port information is included in the port information corresponded to the identified reception VLAN information and stored in the VLAN information storing unit 223 or not. Then, it is also possible that the packet relay apparatus 200 identifies the port included in the partition corresponding to the reception port, from the partition information storing unit 222 and transmits the packet from the identified port in response to the determination that the reception port is included therein. Note that the packet relay apparatus 200 may make a determination in which only the reception port is used instead of the determination as to the transmission port information.

In addition, for example, possible embodiments are not limited to the embodiments disclosed above, and various embodiments are possible by appropriately combining the embodiments disclosed above. For example, the first embodiment discloses the method in which the following two methods, that is, (1) and (2), are carried out in combination: (1) In storing the port information in the partition information storing unit 222, the port information is stored in the VLAN information storing unit 223 and then the port information is stored in the partition information storing unit 222. (2) In deleting the port information, the port information is deleted from the partition information storing unit 222, and then the port information is deleted from the VLAN information storing unit 223. However, the present invention is not limited thereto. It is also possible that any one of the above methods is carried out or none of the both methods is carried out.

Moreover, the processing procedure, the control procedure, the specific names, pieces of information that includes various data and parameters (for example, FIG. 1 through FIG. 28), all illustrated and indicated in the present application and the drawings attached thereto, may be appropriately modified unless otherwise mentioned. For example, Operation S204 may be carried out after execution of Operation S206, in the example illustrated in FIG. 9.

In addition it is unnecessary that the respective structural elements of the respective units are physically formed as disclosed above. That is to say, the specific details of distribution and integration of the respective units are not limited to the ones disclosed hereinabove, and all or a part thereof may be functionally and/or physically configured in a distributed or integrated manner with respect to each appropriate building block, depending on types of loads, usage status or the like. For example, the switch core storing unit 220 in the packet relay apparatus 200 may be provided in a distributed manner, in the example illustrated in FIG. 4.

According to one aspect of the packet relay apparatus disclosed in the present application, an advantageous effect that packets are separately handled with respect to each VLAN may be achieved.

What is claimed is:

1. A packet relay apparatus which includes a plurality of ports comprising:
    a partition information storing unit which stores a correspondence between port information for identifying each of a plurality of ports included in a partition and partition information for identifying the partition configured for the packet relay apparatus;
    a VLAN (Virtual Local Area Network) information storing unit which stores a correspondence between the port information for identifying a port used for transmission and/or reception of a packet transmitted by an apparatus belonging to a virtual network and VLAN information for identifying the virtual network;
    an identification unit which identifies the port information for identifying a port included in the partition corresponding to a reception port receiving the packet, from the partition information storing unit;
    a determination unit which identifies reception VLAN information which is the VLAN information set for the received packet and determines whether the port information identified by the identification unit is included in the port information corresponded to the identified reception VLAN information and stored in the VLAN information storing unit; and
    a transmission unit which transmits the packet from a transmission port corresponding to port information that is determined to be corresponded to the identified reception VLAN information by the determination unit when the port information identified by the identification unit is included in the port information corresponded to the identified reception VLAN information and both the reception and transmission ports are included in the same partition, and otherwise discards the packet.

2. The apparatus according to claim 1, further comprising:
    a reception unit which receives the VLAN information and information for identifying the port which does not transmit/receive the packet from the apparatus belonging to the virtual network identified based on the VLAN information, from among the plurality of ports included in the partition; and
    a deletion unit which deletes the port information identified by the information for identifying the port which does not transmit/receive the packet, from the port information corresponded to the VLAN information received by the reception unit and stored in the VLAN information storing unit.

3. The apparatus according to claim 2, wherein when a plurality of partitions is configured for the packet relay apparatus, the deletion unit does not delete port information included in a different partition from the partition corresponding to the port information identified by the information for identifying the port which does not transmit/receive the packet, from the port information corresponded to the VLAN information received by the reception unit and stored in the VLAN information storing unit.

4. The apparatus according to claim 1, further comprising:
    a port information storing unit which stores the port information in the VLAN information storing unit and thereafter stores the port information in the partition information storing unit when the port information is stored in the partition information storing unit and the VLAN information storing unit.

5. The apparatus according to claim 4, wherein the packet relay apparatus is connected with an acceptance unit which accepts configuration contents for the partition information storing unit and the VLAN information storing unit from a user and receives the configuration contents for the VLAN information storing unit and/or the partition information storing unit, all at once, from the acceptance unit.

6. The apparatus according to claim 1, further comprising:
    a port information deletion unit which deletes the port information from the partition information storing unit and thereafter deletes the port information from the VLAN information storing unit when the port information is deleted from the partition information storing unit and the VLAN information storing unit.

7. The apparatus according to claim 1, wherein when the VLAN information storing unit stores no correspondence between the port information and the reception VLAN information, the determination unit makes a determination on an assumption that the VLAN information storing unit stores a correspondence between all the port information and the reception VLAN information.

8. The apparatus according to claim 1, wherein when a plurality of packet relay apparatuses are connected with each other by using a port and the packet is to be transmitted from the port connected with another packet relay apparatus among the plurality of ports, the transmission unit identifies the partition information corresponding to a reception port information, from the partition information storing unit and transmits the packet to which the identified partition information is added, and when the packet is received from the port connected with the other packet relay apparatus among the plurality of ports, the identification unit identifies the partition information added to the received packet, and the transmission unit identifies the port information corresponded to the identified partition information from the partition information storing unit and transmits the packet from the identified port.

9. The apparatus according to claim 8, wherein the partition is one of a same-partition all of whose ports included in the partition are provided within the same packet relay apparatus and a non-same-partition all of whose ports included in the partition is not always provided within the same packet relay apparatus, a given number of pieces of the partition information is stored by the partition information storing unit, and the given number of pieces of the partition information is allocated in advance to the partition information for identifying the same-partition, the partition information for identifying the non-same-partition, and the partition information for identifying the same-partition or the non-same-partition.

10. The apparatus according to claim 1, wherein the partition information storing unit stores the port information for identifying the plurality of ports included in the partition with respect to each piece of the partition information allocated, in advance, with respect to each reception port, and the transmission unit transmits the packet from the port included in the partition identified by the partition information allocated in advance to the reception port.

11. A packet relay method executed by a computer, the method comprising:
identifying port information for identifying a port included in a partition corresponding to a reception port having received a packet, from a partition information storing unit which stores a correspondence between port information for identifying each of a plurality of ports included in the partition and partition information for identifying the partition configured for the packet relay method;
determining whether the identified port information is included in the port information stored and corresponded to reception VLAN (Virtual Local Area Network) information which is VLAN information set for a received packet by a VLAN information storing unit, which is a storing unit storing a correspondence between port information for identifying a port used for transmission and/or reception of a packet transmitted by an apparatus belonging to a virtual network and VLAN information for identifying the virtual network; and
transmitting the packet from a transmission port corresponding to the identified port information that is determined to be corresponded to the reception VLAN information when the identified port information is included in the port information corresponded to the identified reception VLAN information and both the reception and transmission ports are included in the same partition and otherwise discarding the packet.

12. The method according to claim 11, further comprising:
receiving the VLAN information and information for identifying a port which does not transmit/receive the packet from the apparatus belonging to the virtual network identified by the VLAN information, from among the plurality of ports included in the partition; and
deleting the port information identified by the information for identifying the port which does not transmit/receive the packet, from the port information corresponded to the received VLAN information and stored in the VLAN information storing unit.

13. The method according to claim 12, wherein when a plurality of partitions is configured for the packet relay method,
the deletion procedure does not delete port information included in a different partition from the partition corresponding to the port information identified by the information for identifying the port which does not transmit/receive the packet, from the port information corresponded to the received VLAN information and stored in the VLAN information storing unit.

14. The method according to claim 11, further comprising:
storing the port information in the VLAN information storing unit and thereafter storing the port information in the partition information storing unit when the port information is stored in the partition information storing unit and the VLAN information storing unit.

15. The method according to claim 14, further comprising receiving configuration contents for the VLAN information storing unit and/or the partition information storing unit, all at once, from an acceptance unit which accepts the configuration contents for the partition information storing unit and the VLAN information storing unit from a user.

16. The method according to claim 11, further comprising:
deleting the port information from the partition information storing unit and thereafter deleting the port information from the VLAN information storing unit when the port information is deleted from the partition information storing unit and the VLAN information storing unit.

17. The method according to claim 11, wherein when the VLAN information storing unit stores no correspondence between the port information and the reception VLAN information, the determination procedure is performed on an assumption that the VLAN information storing unit stores a correspondence between all the port information and the reception VLAN information.

18. The method according to claim 11, wherein when a plurality of packet relay apparatuses are connected with each other by using a port and the packet is to be transmitted from the port connected with another packet relay apparatus among the plurality of ports, the transmission procedure identifies the partition information corresponding to a reception port information, from the partition information storing unit and transmits the packet to which the identified partition information is added, and when the packet is received from the port connected with the other packet relay apparatus among the plurality of ports, the identification procedure identifies the partition information added to the received packet, and the transmission procedure identifies the port information corresponded to the identified partition information from the partition information storing unit and transmits the packet from the identified port.

19. The method according to claim 18, wherein the partition is one of a same-partition all of whose ports included in the partition are provided within the same packet relay apparatus and a non-same-partition all of whose ports included in the partition is not always provided within the same packet relay apparatus, a given number of pieces of the partition information is stored by the partition information storing unit, and the given number of pieces of the partition information is allocated in advance to the partition information for identifying the same-partition, the partition information for identifying the non-same-partition, and the partition information for identifying the same-partition or the non-same-partition.

* * * * *